US008180322B2

(12) United States Patent
Nakae et al.

(10) Patent No.: US 8,180,322 B2
(45) Date of Patent: May 15, 2012

(54) RADIO COMMUNICATION DEVICE, BAND SETTING SYSTEM

(75) Inventors: Hironori Nakae, Osaka (JP); Yoshitaka Ohta, Osaka (JP)

(73) Assignee: Panasonic Corporation, Osaka (JP)

( * ) Notice: Subject to any disclaimer, the term of this patent is extended or adjusted under 35 U.S.C. 154(b) by 656 days.

(21) Appl. No.: 12/096,750

(22) PCT Filed: Dec. 14, 2006

(86) PCT No.: PCT/JP2006/324970
§ 371 (c)(1),
(2), (4) Date: Jun. 9, 2008

(87) PCT Pub. No.: WO2007/069695
PCT Pub. Date: Jun. 21, 2007

(65) Prior Publication Data
US 2009/0168707 A1    Jul. 2, 2009

(30) Foreign Application Priority Data

Dec. 15, 2005    (JP) .................................. 2005-361571

(51) Int. Cl.
*H04M 1/66* (2006.01)
(52) U.S. Cl. .......................... 455/410; 455/436; 370/329
(58) Field of Classification Search .................. 455/410, 455/411, 432.1, 432.3, 435.1, 436, 437, 412.1; 370/329
See application file for complete search history.

(56) References Cited

U.S. PATENT DOCUMENTS

| 7,801,074 | B2 * | 9/2010 | Kim et al. ..................... 370/329 |
| 2004/0215735 | A1 * | 10/2004 | Nakahara et al. ............. 709/207 |
| 2005/0239465 | A1 * | 10/2005 | Lee et al. ........................ 455/436 |
| 2006/0002345 | A1 * | 1/2006 | Lapraye ........................ 370/331 |
| 2006/0111111 | A1 * | 5/2006 | Ovadia .......................... 455/439 |
| 2007/0111731 | A1 * | 5/2007 | Zaki ............................... 455/436 |
| 2010/0136977 | A1 * | 6/2010 | Gazzard ........................ 455/436 |
| 2010/0189066 | A1 * | 7/2010 | Tan et al. ....................... 370/329 |

FOREIGN PATENT DOCUMENTS

| JP | 10-145424 | 5/1998 |
| JP | 2000-69050 | 3/2000 |
| JP | 2005-210148 | 8/2005 |
| JP | 2005-236388 | 9/2005 |

OTHER PUBLICATIONS

International Search Report issued Mar. 6, 2007 in the International (PCT) Application of which the present application is the U.S. National Stage.

* cited by examiner

*Primary Examiner* — Kamran Afshar
*Assistant Examiner* — Khawar Iqbal
(74) *Attorney, Agent, or Firm* — Wenderoth, Lind & Ponack, L.L.P.

(57) ABSTRACT

A wireless communication device capable of receiving a content by securing a band as much as possible, if a predetermined band is required to be secured when the content is received by wire. The wireless communication device judges whether or not the predetermined band necessary for receiving the content can be secured with a wireless master device. When it is judged that the predetermined band cannot be secured, the wireless communication device switches a connection destination from the wireless master device to which the wireless communication device has been connected to a different wireless master device that can secure the predetermined band, e.g., a predetermined receiving electric field strength.

7 Claims, 18 Drawing Sheets

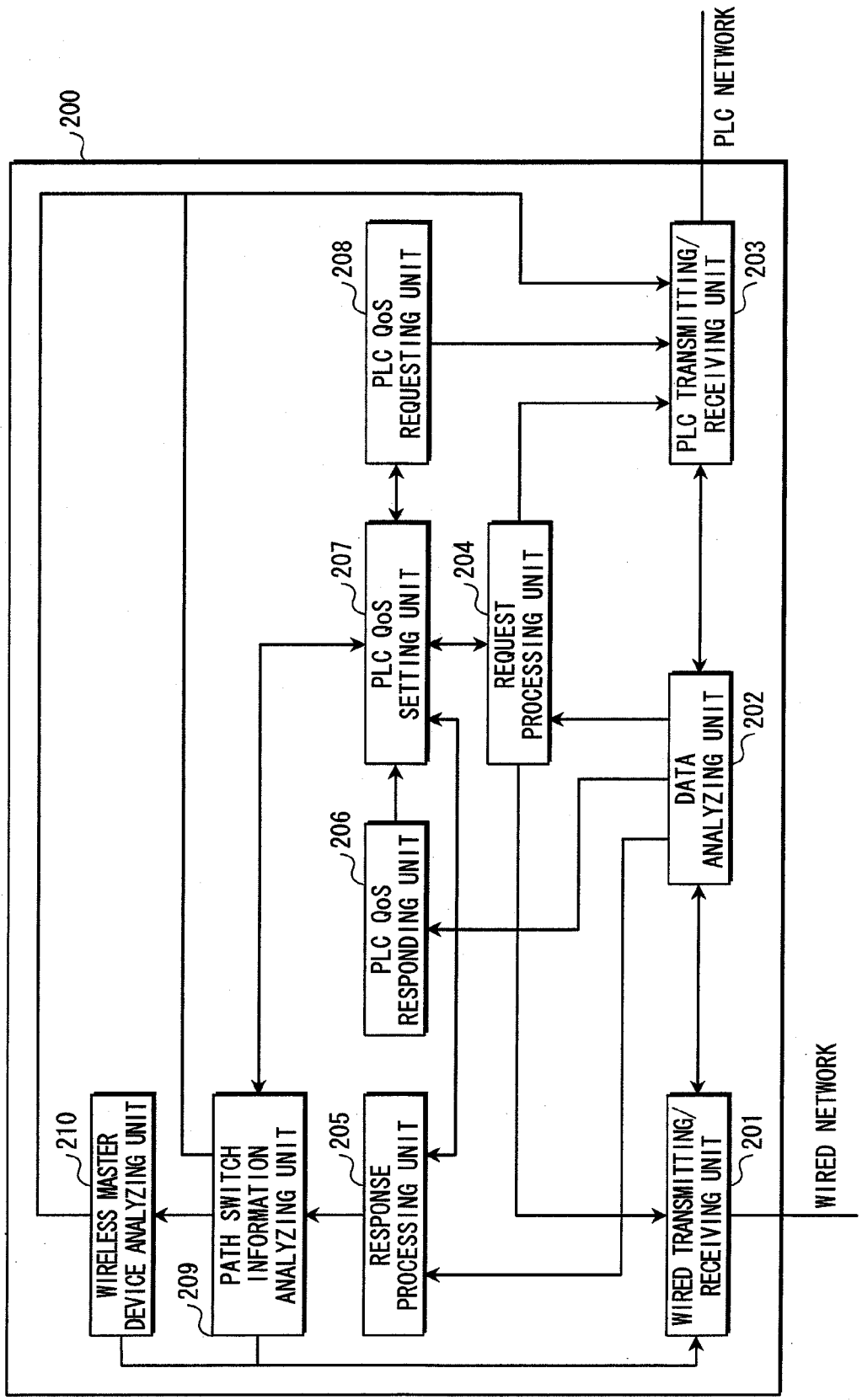

FIG. 4A

| CONTENT IDENTIFIER | WIRELESS MASTER DEVICE ADDRESS | CONNECTION FLAG |
|---|---|---|
| INFORMATION INCLUDED IN BAND SETTING REQUEST | WIRELESS MASTER DEVICE 320b | 1 (CONNECTED) |
| | WIRELESS MASTER DEVICE 320c | 0 (UNCONNECTED) |
| | WIRELESS MASTER DEVICE 320d | 0 (UNCONNECTED) |
| ⋮ | ⋮ | ⋮ |

| CONTENT IDENTIFIER | WIRELESS MASTER DEVICE ADDRESS | CONNECTION FLAG |
|---|---|---|
| INFORMATION INCLUDED IN BAND SETTING REQUEST | WIRELESS MASTER DEVICE 320b | 1 (CONNECTED) |
| | WIRELESS MASTER DEVICE 320c | 1 (CONNECTED) |
| | WIRELESS MASTER DEVICE 320d | 0 (UNCONNECTED) |
| ⋮ | ⋮ | ⋮ |

420b

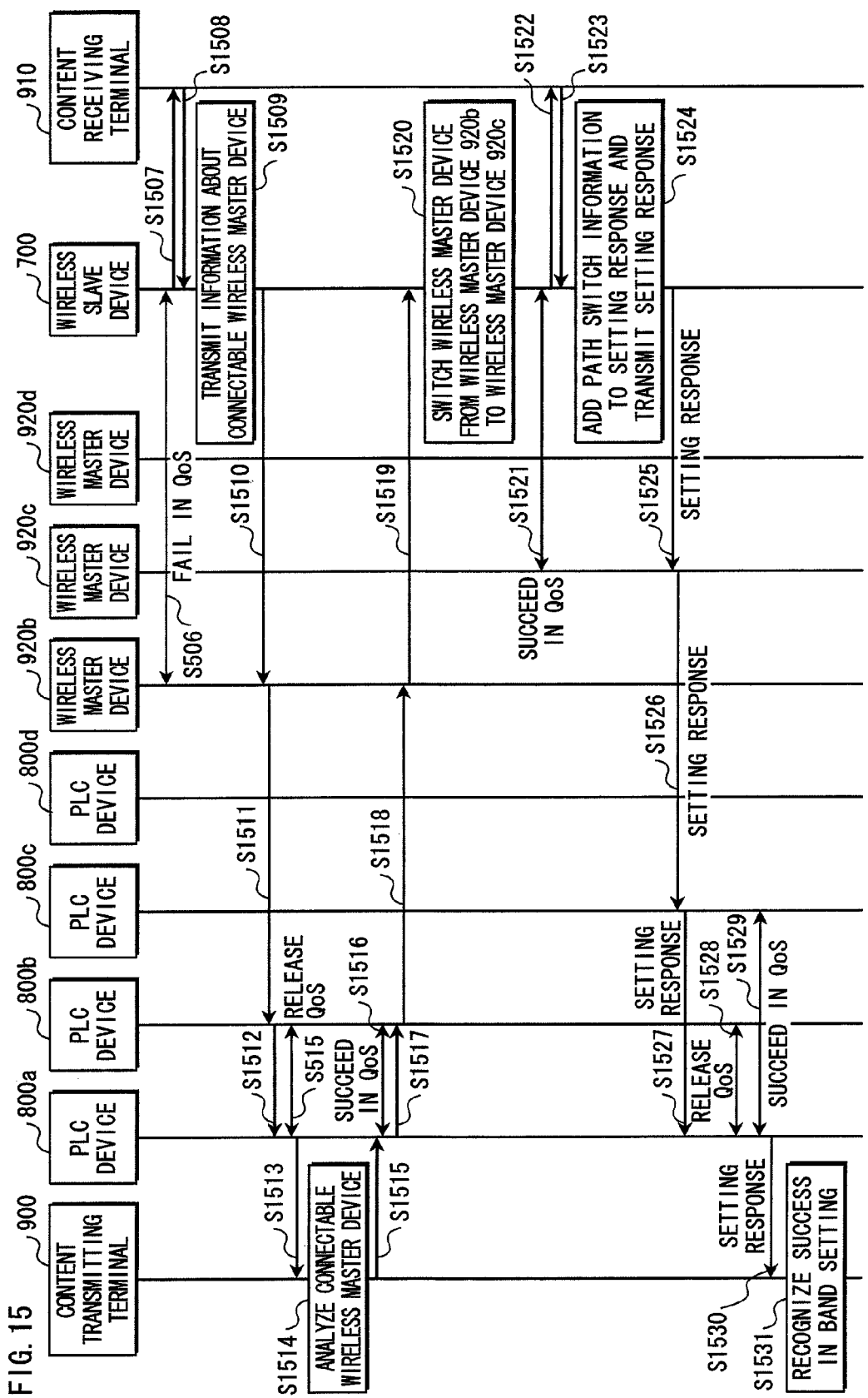

FIG. 16A

Table 1600:

| CONTENT IDENTIFIER | WIRELESS MASTER DEVICE ADDRESS | CONNECTION FLAG |
|---|---|---|
| INFORMATION INCLUDED IN BAND SETTING REQUEST | WIRELESS MASTER DEVICE 920b | 1 (CONNECTED) |
| | WIRELESS MASTER DEVICE 920c | 0 (UNCONNECTED) |
| | WIRELESS MASTER DEVICE 920d | 0 (UNCONNECTED) |
| | WIRELESS MASTER DEVICE 920e | 0 (UNCONNECTED) |
| | WIRELESS MASTER DEVICE 920f | 0 (UNCONNECTED) |
| ⋮ | ⋮ | ⋮ |

FIG. 16B

Table 1610:

| CONTENT IDENTIFIER | WIRELESS MASTER DEVICE ADDRESS | CONNECTION FLAG |
|---|---|---|
| INFORMATION INCLUDED IN BAND SETTING REQUEST | WIRELESS MASTER DEVICE 920b | 1 (CONNECTED) |
| | WIRELESS MASTER DEVICE 920c | 0 (UNCONNECTED) |
| | WIRELESS MASTER DEVICE 920d | 0 (UNCONNECTED) |

RADIO COMMUNICATION DEVICE, BAND SETTING SYSTEM

TECHNICAL FIELD

The present invention relates to a wireless communication device, especially to a technique of securing a band for delivering contents.

BACKGROUND ART

In wireless delivery of contents such as stream delivery, a predetermined band is secured between a server that delivers the contents and a terminal that receives the contents, in, order to smoothly reproduce contents that are required to reproduce in time, such as an audio, a moving image, and the like. The contents are delivered from the server to the terminal by wireless or wire via a device such as a router. The technique of securing the band is known as a QoS (Quality of Service).

In the above technique, a band specified by a server that delivers a content is reserved between a content transmitting device and a content receiving device before the content is transmitted in order to assure a constant communication speed for transmitting the content.

Examples of the above technique of securing the band are disclosed by the following patent document 1 and patent document 2. The following simply describes each of techniques of the patent documents 1 and 2, with reference to the attached drawings.

The patent document 1 discloses a system in which an optimum settable value is set in a band setting when a content is transmitted and received. A specific example of the system is shown in FIG. 17. A content is transmitted from a content transmitting terminal 1700 to a content receiving terminal 1720 via relay devices 1710a and 1710b. The content transmitting terminal 1700 firstly reserves a band required for transmitting a content before transmitting the content. The content transmitting terminal 1700 specifies both of a requested band required for optimally transmitting the content and a minimum band required for minimally transmitting the content for the relay device 1710a. Here, the requested band is referred to as "request band", and the minimum band is referred to as "minimum request band". The request band indicates the highest level of the band that is considered most desirable for receiving a content, and the minimum request band indicates the lowest level of the band for managing to receive the content. In FIG. 17, suppose that a request band requested by the content transmitting terminal 1700 is 18 Mbps (Mega Bit Per Second), and a minimum request band requested by the content transmitting terminal 1700 is 12 Mbps. Then, the relay device 1710a detects an unassigned band that can be secured by the relay device 1710a. Here, suppose that the unassigned band of the relay device 1710a is 20 Mbps. Then, the relay device 1710a notifies the relay device 1710b of a band setting request indicating that the request band is 18 Mbps, and the minimum request band is 12 Mbps.

Next, suppose that an unassigned band of the relay device 1710b is 16 Mbps. Then, the relay device 1710b notifies the content receiving terminal 1720 of a band setting request indicating that the request band is 16 Mbps, and the minimum request band is 12 Mbps.

The content receiving terminal 1720 determines the band 16 Mbps that is the highest settable band at the time as a band that can be secured for receiving the content. Then, the content receiving terminal 1720 transmits a band setting response indicating 16 Mbps as the settable band information to the content transmitting terminal 1700 via each of the relay devices. As a result, the content transmitting terminal 1700 transmits the content to the content receiving terminal 172Q at a communication speed of 16 Mbps. Using the technique disclosed by the patent document 1, contents can be transmitted and received in the highest level of the band that can be secured when the band is secured.

The patent document 2 discloses the following system as shown in FIG. 18. The system includes a wireless master device 1810a and a wireless master device 1810b each of which is arranged on a wired network, a wireless slave device 1820a, a wireless slave device 1820b, and a wireless slave device 1820d each of which is wirelessly connected to the wireless master device 1810a, a wireless slave device 1820c which is wirelessly connected to the wireless master device 1810b, and a manager 1800 on the wired network to which each of the wireless master devices is connected, which manages each of the wireless slave devices is wirelessly connected to which wireless master device. The patent document 2 discloses a method to avoid a case in which a band is insufficient when data is transmitted and received, by controlling the system so that a traffic volume in each part of the network becomes even as much as possible.

In FIG. 18, three wireless slave devices are connected to the wireless master device 1810a. Also, one wireless slave device is connected to the wireless master device 1810b. In this case, the number of the connected wireless slave devices is different between the wireless master device 1810a and the wireless master device 1810b. As a result, a traffic volume in the wireless master device 1810a is larger than a traffic volume in the wireless master device 1810b.

Therefore, when the manager 1800 that manages a traffic volume in the network detects that the traffic volume in the wireless master device 1810a exceeds a threshold value, the manager 1800 detects whether or not any of the wireless slave devices wirelessly connected to the wireless master device 1810a can be wirelessly connected to the wireless master device 1810b. When detecting that the wireless slave device 1820b can be wirelessly connected to the wireless master device 1810b, the manager 1800 instructs the wireless slave device 1820b to switch a connection destination from the wireless master device 1810a to the wireless master device 1810b. As a result, the number of the wireless slave devices connected to the wireless master device 1810a decreases and the traffic volume in the wireless master device 1810a also decreases. This can avoid a case in which communication is interrupted between the wireless slave devices connected to the wireless master device 1810a and the wireless master device 1810a.

Patent Document 1: Japanese Published Patent Application No. H10-145424
Patent Document 2: Japanese Published Patent Application No. 2000-69050

DISCLOSURE OF THE INVENTION

Problems the Invention is going to Solve

In the patent document 1, when an unassigned band of the relay device 1710b is only 10 Mbps, for example, the unassigned band 10 Mbps is less than the minimum request band requested by the content transmitting terminal 1700. As a result, the content receiving terminal 1720 cannot receive a desired content. Therefore, it is preferable to use a technique of receiving a content by searching other path from the content transmitting terminal to the content receiving terminal.

In view of the above problem, an object of the present invention is to provide a wireless communication device and a band setting system that can set a new path for delivering contents in a network including a relay device between a content transmitting terminal and a content receiving terminal.

Means of Solving the Problems

The above-mentioned object can be achieved by a wireless communication device that receives a content from a content transmitting terminal via one of a plurality of wireless master devices, and transmits the received content to a content receiving terminal, the wireless communication device comprising: a judging unit operable to judge whether or not a predetermined band necessary for receiving the content is securable with the wireless master device; and a connecting unit operable to, when the judging unit judges that the predetermined band is unsecurable with the wireless master device, search an other wireless master device from the plurality of wireless master devices, which is different from the currently connected wireless master device, and wirelessly connect to the other wireless master device.

EFFECTS OF THE INVENTION

With the above-stated construction, when the wireless communication device cannot secure a band for receiving a content with a wireless master device that is originally connected to the wireless communication device, the wireless communication device can be automatically connected to other wireless master device. If the wireless communication device can be connected to the new wireless master device, a band resetting can be performed with the new wireless master device. Therefore, this increases a possibility that the wireless communication device can be connected to a wireless master device that can set a band.

Moreover, in the present invention, a wireless master device that is a connection destination is switched by a wireless slave device. Therefore, a connection can be changed without a management device such as the manager shown in the patent document 2, and it does not cost for providing the manager. Note that the wireless communication device corresponds to the wireless slave device in an embodiment of the description.

Also, the judging unit judges whether or not the predetermined band is securable with the other wireless master device, and the wireless communication device further comprises: a transmitting unit operable to, when the judging unit judges that the predetermined band is securable with the other wireless master device, transmit path switch information to the other wireless master device, the path switch information indicating that a wireless connection destination of the wireless communication device has been switched to the other wireless master device.

With the above-stated construction, a device in upstream of a network of the wireless communication device can recognize that the wireless master device that is a connection destination of the wireless communication device is switched, and can correctly secure a new path from the transmitting terminal to the receiving terminal.

Also, the judging unit judges whether or not the predetermined band is securable with the other wireless master device, and the wireless communication device further comprises: a transmitting unit operable to, when the judging unit judges that the predetermined band is securable with the other wireless master device, transmit path switch information to the currently connected wireless master device before a wireless connection destination of the wireless communication device is switched to the other wireless master device, the path switch information indicating that the wireless connection destination is to be switched to the other wireless master device.

With the above-stated construction, when the predetermined band cannot be secured, the wireless communication device notifies the wireless master device that is originally connected to the wireless communication device that the wireless master device that is the wireless connection destination is switched. This certainly notifies the device in the upstream of the network that the wireless master device that is the wireless connection destination has been switched. The device in the upstream of the network can correctly secure a new path from the transmitting terminal to the receiving terminal based on the transmitted path switch information.

Moreover, the transmitting unit adds the path switch information to a band setting response and transmits the band setting response to the other wireless master device, the band setting response being a response to a band setting request that is transmitted from the content transmitting terminal and requests securing of the predetermined band.

With the above-stated construction, the wireless communication device can notify the transmitting terminal that the wireless master device that is the connection destination has been switched, by adding the path switch information to the band setting response. This can easily realize the notification without adding a new construction.

Furthermore, the judging unit includes: a requesting subunit operable to request the wireless master device to secure the predetermined band; and a receiving subunit operable to receive band securing information that is transmitted from the wireless master device and indicates whether or not the predetermined band is securable, wherein the judging unit judges whether or not the predetermined band is securable based on the band securing information received by the receiving subunit.

With the above-stated construction, the wireless communication device can judge whether or not the predetermined band can be secured based on the information indicating whether or not the predetermined band can be secured transmitted from the wireless master device.

Also, the wireless communication device further comprises: a receiving unit operable to receive a beacon signal transmitted from each of the plurality of wireless master devices; and a receiving electric field strength judging unit operable to judge whether or not a receiving electric field strength of the beacon signal received by the receiving unit exceeds a predetermined receiving electric field strength stored in the wireless communication device, wherein the connecting unit connects to any of the plurality of wireless master devices that transmits a beacon signal having a receiving electric field strength judged to exceed the predetermined receiving electric field strength by the receiving electric field strength judging unit.

With the above-stated construction, the wireless communication device can search a connectable wireless master device.

Moreover, the connecting unit connects to wireless master devices out of the plurality of wireless master devices, each of which transmits the beacon signal having the receiving electric field strength judged to exceed the predetermined receiving electric field strength by the receiving electric field strength judging unit, in descending order of receiving electric field strengths.

With the above-stated construction, when the predetermined band cannot be secured, the wireless communication device switches the connection destinations in the order of descending the receiving electric field strengths. By switching the connection destination to the wireless master device having higher receiving electric field strength, better communication can be performed.

Furthermore, the path switch information includes information about the wireless connection destination and information about the wireless master device judged by the receiving electric field strength judging unit.

With the above-stated construction, when the predetermined band cannot be secured between the transmitting terminal to the wireless master device that is newly connected to the wireless communication device, the transmitting terminal or a device between the transmitting terminal and the wireless master device can recognize whether or not the wireless slave device can be connected to other wireless master device. Therefore, when there is an unconnected wireless master device, it is recognized that the predetermined band can be secured by other path.

Also, the wireless communication device performs communication complying with an IEEE802.11e standard.

With the above-stated construction, communication complying with the IEEE802.11e standard can be performed, which is current mainstream in wireless communication. By complying with the current standard, a cost for facility development can be reduced.

Moreover, the band setting system of the present invention includes a transmitting terminal, a receiving terminal, and a plurality of relay devices, and performs a band setting for transmitting and receiving a content, the transmitting terminal transmitting the content, the receiving terminal receiving the content, and the plurality of relay devices relaying data transmitted and received between the transmitting terminal and the receiving terminal for transmitting the content, wherein the transmitting terminal comprises: a band requesting unit operable to request some of the plurality of relay devices in a path between the transmitting terminal and the receiving terminal to secure a predetermined band necessary for transmitting the content, one of the plurality of relay devices that is wirelessly connected to the receiving terminal comprises: a first judging unit operable to judge whether or not the predetermined band is assignable to the receiving terminal based on an unassigned band included in the relay device; a securing unit operable to secure the predetermined band when the first judging unit judges that the predetermined band is assignable to the receiving terminal; and a transmitting unit operable to transmit, to the receiving terminal, assignable/unassignable information indicating whether or not the predetermined band is assignable to the receiving terminal based on a result of the judgment by the first judging unit, and the receiving terminal comprises: a receiving unit operable to receive the assignable/unassignable information; a second judging unit operable to judge whether or not the predetermined band is securable with the relay device based on the assignable/unassignable information; and a wireless connecting unit operable to, when the second judging unit judges that the predetermined band is unsecurable with the relay device, search an other relay device from the plurality of relay devices, which is different from the currently connected relay device, and wirelessly connect to the other relay device.

Furthermore, the transmitting terminal further comprises: a securing unit operable to secure the predetermined band with the relay device, the second judging unit further judges whether or not the predetermined band is securable with the other relay device, the receiving terminal further comprises: a path switch information transmitting unit operable to transmit, to the other relay device, path switch information indicating that a wireless connection destination of the receiving terminal has been switched to the other relay device, the other relay device transmits the path switch information to the transmitting terminal, and the securing unit secures the predetermined band with the other relay device when the path switch information is received from the other relay device.

Here, the transmitting terminal corresponds to a combination of a content transmitting terminal and a PLC (Power Line Communication) device in the embodiment of the description. The receiving terminal corresponds to the wireless slave device in the embodiment of the description. The relay device corresponds to a combination of a wireless master device and the PLC device.

With the above-stated construction, when the receiving terminal cannot secure the predetermined band necessary for receiving a content with the relay device in the band setting system, the receiving terminal searches a new relay device and is connected to the new relay device. As a result, the receiving terminal can secure a new path for transmitting and receiving the content. By securing the new path, a possibility of securing the predetermined band and transmitting and receiving the content increases.

Also, the band requesting unit requests some of the plurality of relay devices to secure the predetermined band by making a band setting request that requests securing of the predetermined band and transmitting the band setting request to the relay devices, and the path switch information transmitting unit adds the path switch information to a band setting response that is a response to the band setting request.

With the above-stated construction, by adding the path switch information to the band setting response, the present invention can be easily applied to an existing technique.

Moreover, a wireless network connecting the relay device to the receiving terminal complies with an IEEE802.11e standard, and the receiving terminal performs wireless communication complying with the IEEE802.11e standard.

With the above-stated construction, communication complying with the IEEE802.11e standard can be performed, which is current mainstream in wireless communication. By complying with the current standard, a cost for facility development can be reduced.

Furthermore, the band setting system of the present invention includes a transmitting terminal, a receiving terminal, and a plurality of relay devices, and performs a band setting for transmitting and receiving a content, the transmitting terminal transmitting the content, the receiving terminal receiving the content, and the plurality of relay devices relaying data transmitted and received between the transmitting terminal and the receiving terminal for transmitting the content, wherein the transmitting terminal comprises: a band requesting unit operable to request some of the plurality of relay devices in a path between the transmitting terminal and the receiving terminal to secure a predetermined band necessary for transmitting the content; an extracting unit operable to, when first relay device information is received from the relay devices, extract, from the first relay device information, second relay device information about one of, the relay devices on a network to which the transmitting terminal is connected; and a second relay device information transmitting unit operable to transmit, to the relay devices, the second relay device information extracted by the extracting unit, one of the plurality of relay devices that is wirelessly connected to the receiving terminal comprises: a first relaying unit operable to receive the first relay device information from the receiving terminal and transmit the received first relay device information to the transmitting terminal; a second relaying unit operable to receive the second relay device information from the transmitting terminal and transmit the received second relay device information to the receiving terminal; a first judging unit operable to judge whether or not the predetermined band is assignable to the receiving terminal based on an unassigned band included in the relay device; a securing unit operable to secure the predetermined band when the first judging unit judges that the predetermined band is assignable to the receiving terminal; and a transmitting unit operable to transmit, to the receiving terminal, assignable/unassignable information indicating whether or not the predetermined band is assignable to the receiving terminal based on a result of the judgment by the first judging unit, and the receiving terminal comprises: a band requesting unit operable to request the relay device to assign the predetermined band to the receiving terminal; a receiving unit operable to receive the assignable/unassignable information; a second judging unit operable to judge whether or not the predetermined band is securable with the relay device based on the assignable/unassignable information; a searching unit operable to, when the second judging unit judges that the predetermined band is unsecurable with the relay device, search all wirelessly connectable relay devices from the plurality of relay devices, which are different from the relay device; a first relay device information transmitting unit operable to transmit, to the relay device, information about the all relay devices searched by the searching unit as the first relay device information; and a connecting unit operable to receive the second relay device information and wirelessly connect to one of the relay devices included in the second relay device information.

Also, the transmitting terminal further comprises: a securing unit operable to secure the predetermined band with the relay device, the second judging unit further judges whether or not the predetermined band is securable with the other relay device, the receiving terminal further comprises: a path switch information transmitting unit operable to transmit, to the other relay device, path switch information indicating that a wireless connection destination of the receiving terminal has been switched to the other relay device, the other relay device transmits the path switch information to the transmitting terminal, and the securing unit secures the predetermined band with the other relay device when the path switch information is received from the other relay device.

Here, the transmitting terminal corresponds to a combination of the content transmitting terminal and the PLC device of a third embodiment of the description. The receiving terminal corresponds to the wireless slave device in the third embodiment of the description. The relay device corresponds to a combination of the wireless master device and the PLC device.

With the above-stated construction, even if the receiving terminal searches the relay terminal that is not connected to the transmitting terminal when searching the relay device, the transmitting terminal detects the relay device connected to the transmitting terminal based on the information about the relay device transmitted from the receiving terminal and notifies the receiving terminal of the detected relay device. Therefore, the receiving terminal can certainly switch the wireless connection destination to the relay device connected to the transmitting terminal. This can surely secure a path from the transmitting terminal to the receiving terminal, and the QoS setting can be performed in the path. Also, this can avoid a case in which the receiving terminal is connected to the relay device that is not connected to the transmitting terminal.

BRIEF DESCRIPTION OF THE DRAWINGS

FIG. 3 is a functional block diagram showing a functional structure of a PLC device.

FIGS. 4A and 4B are connection tables each showing wireless master devices connectable to a wireless slave device, and whether or not the wireless slave device has been connected to each of the wireless master devices. FIG. 4A is the connection table that is originally held by the wireless slave device, and FIG. 4B is the connection table after the wireless slave device is connected to a wireless master device 320c.

FIG. 15 is a sequence diagram showing a communication flow between devices of the band setting system of the third embodiment.

FIG. 16A shows information about connectable wireless master devices, which is transmitted from the wireless slave device to a content transmitting terminal. FIG. 16B is a connection table which is referred by the wireless slave device when switching the wireless master devices in the third embodiment.

Figure 1:
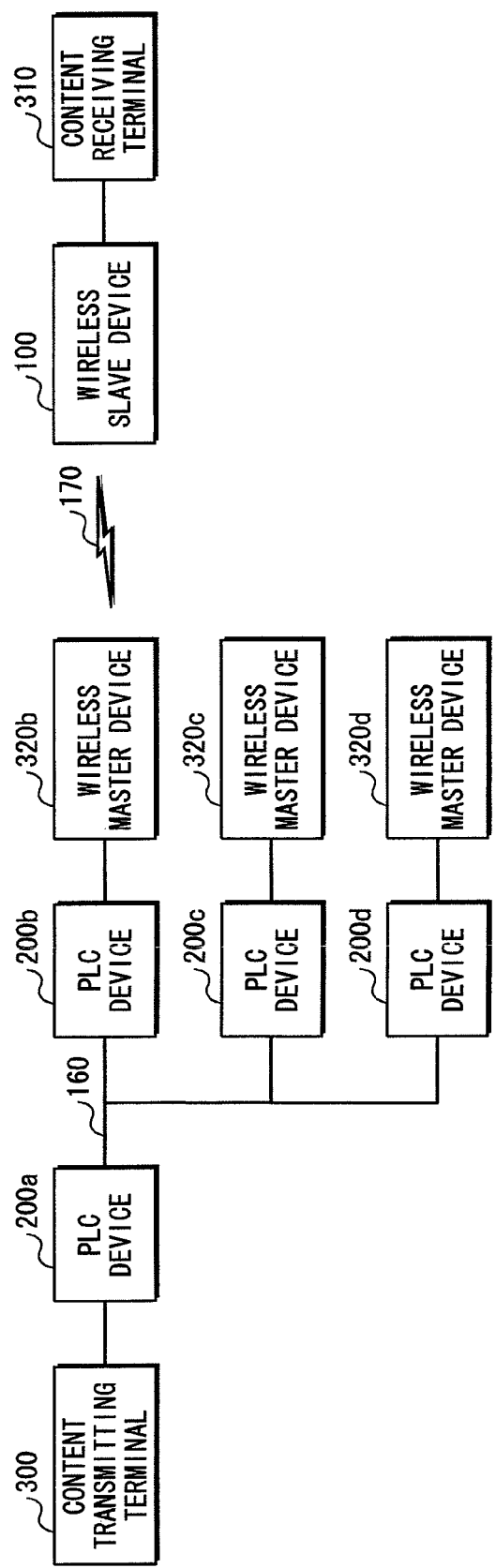
FIG. 1 is a system diagram showing a structure of a band setting system of the present invention.

DESCRIPTION OF REFERENCE NUMERALS 100, 400, 700 wireless slave device
101, 401 wired transmitting/receiving unit
102, 402 data analyzing unit
103, 403 wireless transmitting/receiving unit
104, 404 request processing unit
105, 405 response processing unit
106, 406 wireless QoS responding unit
107, 407 wireless QoS setting unit
108, 408 wireless QoS requesting unit
109, 409 path switch information setting unit
110 wireless master device setting unit
111, 411 wireless master device managing unit 112, 412 wireless master device switching unit
160, 460, 760 PLC network
170, 470, 770 wireless network
200, 200a, 200b, 200c, 200d, 500, 500a, 500b, 500c, 500d, 800, 800a, 800b, 800c, 800d PLC device
201, 501 wired transmitting/receiving unit
202, 502 data analyzing unit
203, 503 PLC transmitting/receiving unit
204, 504 request processing unit
205, 505 response processing unit
206, 506 PLC QoS responding unit
207, 507 PLC QoS setting unit
208, 508 PLC QoS requesting unit
209, 509 path switch information analyzing unit
210 wireless master device analyzing unit
300, 600, 900 content transmitting terminal
310, 610, 910 content receiving terminal
320b, 320c, 320d, 620b, 620c, 620d, 920b, 920c, 920d, 920e, 920f wireless master device
420a, 420b connection table
601, 901 data analyzing unit
602, 902 response processing unit
603 path switch information analyzing unit
604, 904 content transmitting unit
605, 905 request making unit
606, 906 wired transmitting/receiving unit
907 connectable master device analyzing unit
908 connected master device judging unit
1600, 1610 connection table
1700 content transmitting terminal
1710a, 1710b relay device
1720 content receiving terminal
1800 manager
1810a, 1810b wireless master device
1820a, 1820b, 1820c, 1820d, 1820e wireless slave device

BEST MODE FOR CARRYING OUT THE INVENTION

The following describes a wireless communication device and a system of the wireless communication device according to an embodiment of the present invention, with reference to the attached drawings.
<First Embodiment>
<Structure>
FIG. 1 is a system diagram showing a structure of a band setting system. As shown in FIG. 1, the band setting system includes a wireless slave device 100, PLC (Power Line Communication) devices 200a, 200b, 200c, 200d, a content transmitting terminal 300, a content receiving terminal 310, wireless master devices 320b, 320c, and 320d. As shown in FIG. 1, the content transmitting terminal 300 is connected to the PLC device 200a by wire. Also, the PLC devices 200a, 200b, 200c, and 200d are connected to each other via a power line network, and a QoS setting can be performed. As shown in FIG. 1, the PLC device 200b and the wireless master device 320b make a pair. In the same manner as this, the PLC device 200c and the wireless master device 320c make a pair, and the PLC device 200d and the wireless master device 320d make a pair. Also, the wireless slave device 100 is wirelessly connected to the wireless master device 320b, and the wireless slave device 100 and the content receiving terminal 310 make a pair.

The following simply describes the PLC device. The PLC device can perform power line communication, transmit and receive various data using a line for supplying general power. Also, the PLC device has an advantage that power supply and communication can be shared with one line. For example, a TDMA (Time Division Multiple Access) method is used as a communication protocol between the PLC devices. Also, as a setting protocol for a band setting between the terminals, ST2 (internet STream protocol version 2) that is provided by IETF (Internet Engineering Task Force), RSVP (Resource reSerVation Protocol), and the like are used. In the band setting system of the present invention, content of a band setting corresponds to each communication protocol, and a detailed explanation of a data structure will be omitted. Also, a HCCA (Hybrid coordination function Controlled Channel Access) method is used for a band setting in a wireless section. Hereinafter, a band setting is referred to as a QoS setting.

Note that each of a wired network connecting the content transmitting terminal 300 to the PLC device 200a, a wired network connecting each of the PLC devices to each of the wireless master devices, and a wired network connecting the wireless slave device 100 to the content receiving terminal 310 is a network that does not secure a band. For example, Ethernet (a registered trademark) having a band of 100 Mbps is used for the above network.

In this system structure, when a QoS setting necessary for receiving a content cannot be performed with a device in upstream of the network, the wireless slave device 100 switches wireless master devices that are connection targets. This is a great feature of the present invention.

Figure 2:
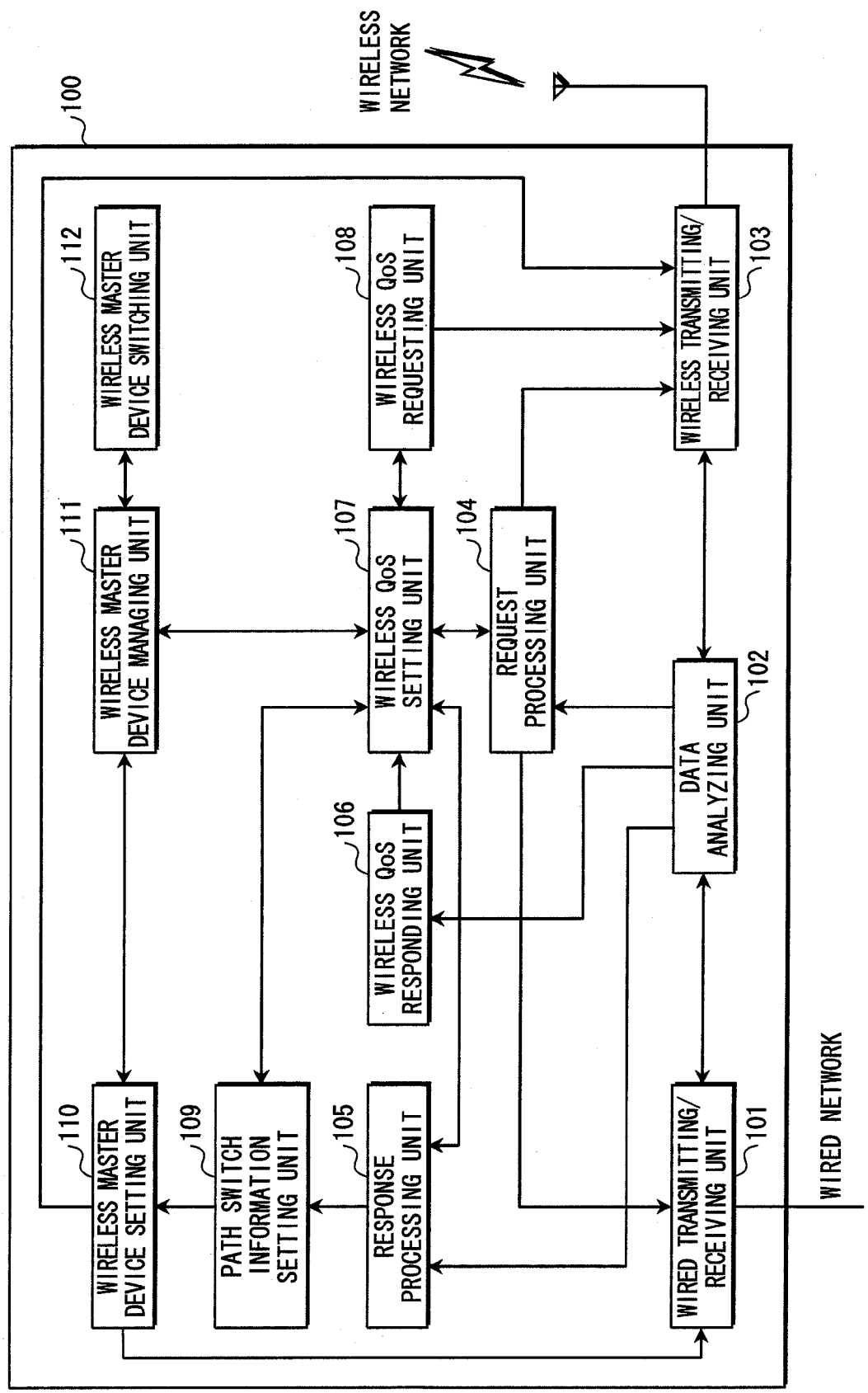
FIG. 2 is a functional block diagram showing a functional structure of a wireless slave device.

The following describes the wireless slave device 100 that is the wireless communication device of the present invention. FIG. 2 is a functional block diagram showing a functional structure of the wireless slave device 100. As shown in FIG. 2, the wireless slave device 100 includes a wired transmitting/receiving unit 101, a data analyzing unit 102, a wireless transmitting/receiving unit 103, a request processing unit 104, a response processing unit 105, a wireless QoS responding unit 106, a wireless QoS setting unit 107, a wireless QoS requesting unit 108, a path switch information setting unit 109, a wireless master device setting unit 110, a wireless master device managing unit 111, and a wireless master device switching unit 112. Each of the above components of the wireless slave device 100 is connected as shown in FIG. 2.

The wired transmitting/receiving unit 101 is connected to a wired network, demodulates data inputted from the wired network, and modulates data to be outputted to the wired network. Also, the wired transmitting/receiving unit 101 transmits a content to the content receiving terminal 310. In a band setting, the wired transmitting/receiving unit 101 transmits, to the content transmitting terminal 300, information indicating whether or not a band necessary for receiving a content can be set on a path from the content transmitting terminal 300 to the wireless slave device 100.

The data analyzing unit 102 analyzes data received by the wired transmitting/receiving unit 101 or the wireless transmitting/receiving unit 103. As a result of the analysis, the data analyzing unit 102 determines a transfer destination of the received data based on a type of the data, and transfers the data to the transfer destination. More specifically, when data received by the wireless transmitting/receiving unit 103 is a band setting request, the data analyzing unit 102 transfers the band setting request to the request processing unit 104. Also, when data received by the wired transmitting/receiving unit 101 is a band setting response, the data analyzing unit 102 transfers the band setting response to the response processing unit 105.

The wireless transmitting/receiving unit 103 is connected to a wireless network, demodulates data inputted via the wireless network, and modulates data to be outputted to the wireless network.

The request processing unit 104 analyzes content of the band setting request transferred from the data analyzing unit 102.

The response processing unit 105 analyzes content of the band setting response transferred from the data analyzing unit 102.

The wireless QoS responding unit 106 analyzes a wireless QoS response transferred from the wireless QoS setting unit 107.

The wireless QoS setting unit 107 performs a QoS setting of the wireless network based on information included in the band setting request transferred from the request processing unit 104.

The wireless QoS requesting unit 108 makes a wireless QoS setting request based on an instruction from the wireless QoS setting unit 107, and outputs the wireless QoS setting request to the wireless network via the wireless transmitting/receiving unit 103.

The path switch information setting unit 109 adds, to the band setting response, information about an wireless master device that is a new connection destination (address information and the like) based on information transferred from the response processing unit 105 and information obtained from the wireless QoS setting unit 107.

The wireless master device setting unit 110 adds, to the band setting response, information about wireless master devices to which the wireless slave device 100 can be connected.

The wireless master device managing unit 111 stores the information about the connectable wireless master devices and information whether or not the wireless slave device 100 has been connected to each of the wireless master devices in correspondence with each other. Also, when a connection destination is switched to a new wireless master device, the wireless master device managing unit 111 updates the information whether or not the wireless slave device 100 has been connected to the new wireless master device to information indicating that the wireless slave device 100 has been connected to the new wireless master device.

The wireless master device switching unit 112 switches the connection destination to the new wireless master device instructed by the wireless master device managing unit 111, and instructs the wireless transmitting/receiving unit 103 to switch the connection destination from an originally connected wireless master device to the new wireless master device.

Since a functional structure of each of the wireless master devices is substantially same as a conventional wireless master device, a detailed explanation of the functional structure will be omitted here.

The following describes the PLC devices 200*a* to 200*d*. Here, the PLC devices 200*a* to 200*d* are collectively called a PLC device 200. FIG. 3 is a functional block diagram showing a functional structure of the PLC device 200. As shown in FIG. 3, the PLC device 200 includes a wired transmitting/receiving unit 201, a data analyzing unit 202, a PLC transmitting/receiving unit 203, a request processing unit 204, a response processing unit 205, a PLC QoS responding unit 206, a PLC QoS setting unit 207, a PLC QoS requesting unit 208, a path switch information analyzing unit 209, and a wireless master device analyzing unit 210. Each of the above components of the PLC device 200 is connected as shown in FIG. 3.

The wired transmitting/receiving unit 201 is connected to a wired network, demodulates data inputted from the wired network, and modulates data to be outputted to the wired network.

The data analyzing unit 202 analyzes data inputted to the wired transmitting/receiving unit 201 and the PLC transmitting/receiving unit 203. As a result of the analysis, the data analyzing unit 202 determines a transfer destination of the inputted data based oh a type of the data, and transfers the data to the transfer destination. More specifically, when the inputted data is a band setting request, the data analyzing unit 202 transfers, the band setting request to the request processing unit 204. Also, when the inputted data is a band setting response, the data analyzing unit 202 transfers the band setting response to the response processing unit 205.

The PLC transmitting/receiving unit 203 is connected to a PLC network 160, demodulates data inputted from the PLC network 160, and modulates data to be outputted to the PLC network 160.

The request processing unit 204 analyzes content of the band setting request transferred from the data analyzing unit 202.

The response processing unit 205 analyzes content of the band setting response transferred from the data analyzing unit 202.

The PLC QoS responding unit 206 analyzes a response to a PLC QoS setting request transferred from the data analyzing unit 202.

The PLC QoS setting unit 207 performs a QoS setting of the PLC network 160 based on information included in the band setting request transferred from the request processing unit 204.

The PLC QoS requesting unit 208 makes a PLC QoS setting request based on an instruction from the PLC QoS setting unit 207, and outputs the PLC QoS setting request to the PLC network 160 via the PLC transmitting/receiving unit 203.

The path switch information analyzing unit 209 analyzes a path switch information that may be added to the band setting response.

The wireless master device analyzing unit 210 analyzes the information about the connectable wireless master devices, which is added to the band setting response by the wireless master device setting unit 110 of the wireless slave device 100, and judges whether or not the wireless slave device 100 can perform communication with other wireless master device.

Up to now, the functional structure of each of the wireless slave device 100 and the PLC device of the first embodiment has been described. Note that a detailed operation of each of the components will be described in an item <Operation> mentioned below.

<Data>

FIG. 4 shows a connection table that is managed by the wireless slave device 100 and transmitted to the upstream of the network. The connection table stores the following in correspondence with each other. More specifically, the connection table stores content identifier information as identifiers of transmitted/received contents, the information about wireless maser devices to which the wireless slave device 100 can be connected, and connection flags each showing whether or not the wireless slave device 100 has been connected to the connectable wireless master devices. The content identifiers include information such as an IP address, a port number, and the like.

FIG. 4A shows a connection table 420*a* in a case in which the wireless slave device 100 requests to receive a content when the wireless slave device 100 is initially connected to the wireless master device 320*b*. FIG. 4B shows a connection table 420*b* in a case in which the wireless slave device 100 switches a connection destination from the wireless master device 320b to the wireless master device 320c when a QoS setting cannot be performed with the wireless master device 320b.

As is clear from a change from FIG. 4A to FIG. 4B, a connection flag of the wireless master device 320c is updated from "0" to "1". "0" indicates that the wireless slave device 100 has not been connected to the wireless master device when receiving the content, and "1" indicates that the wireless slave device 100 has been connected to the wireless master device.

<Operation>

Figure 5:
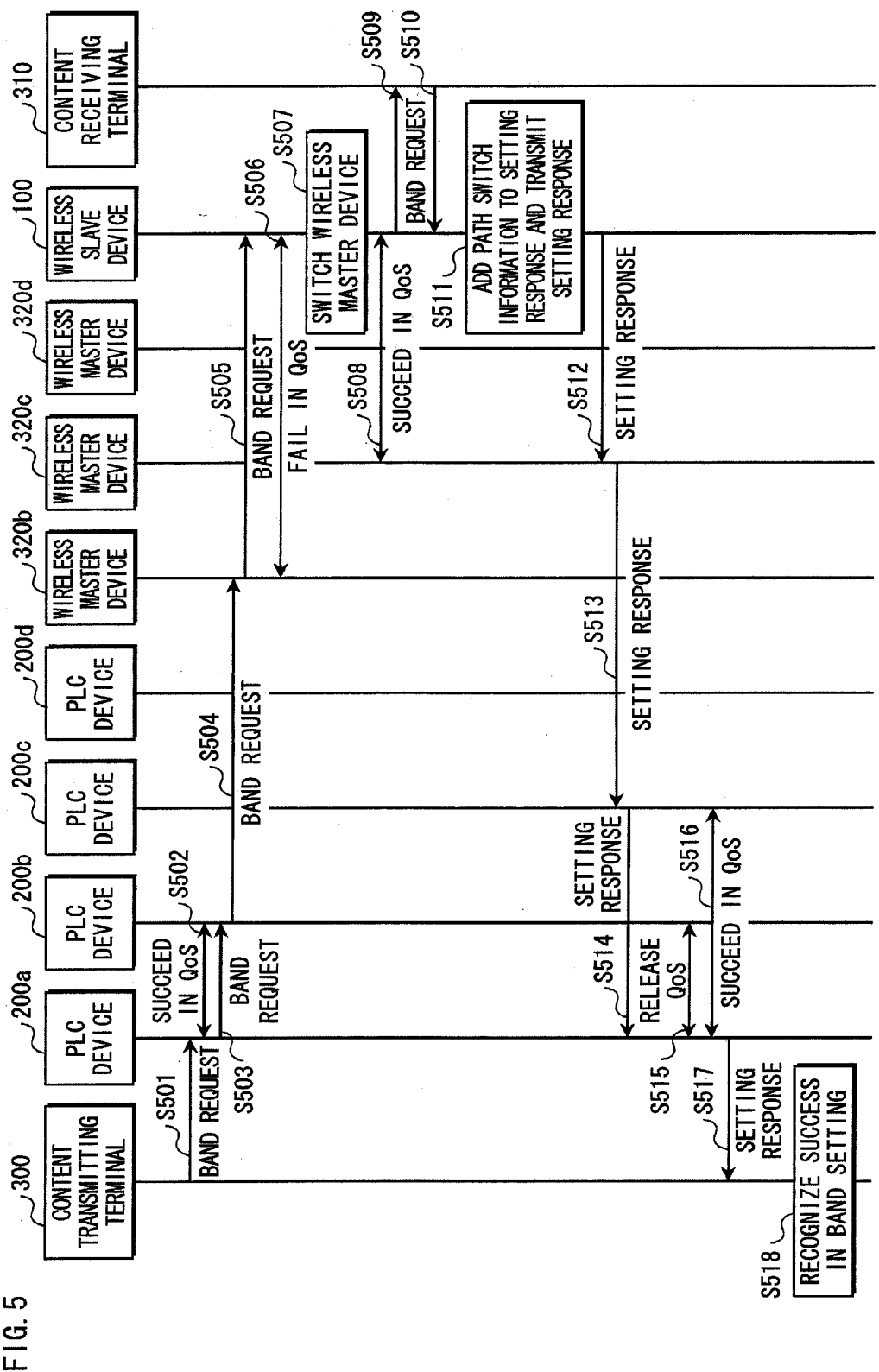
FIG. 5 is a sequence diagram showing communication between wireless devices if the QoS setting between the wireless devices fails when a content transmitting terminal transmits a band request.
Figure 6:
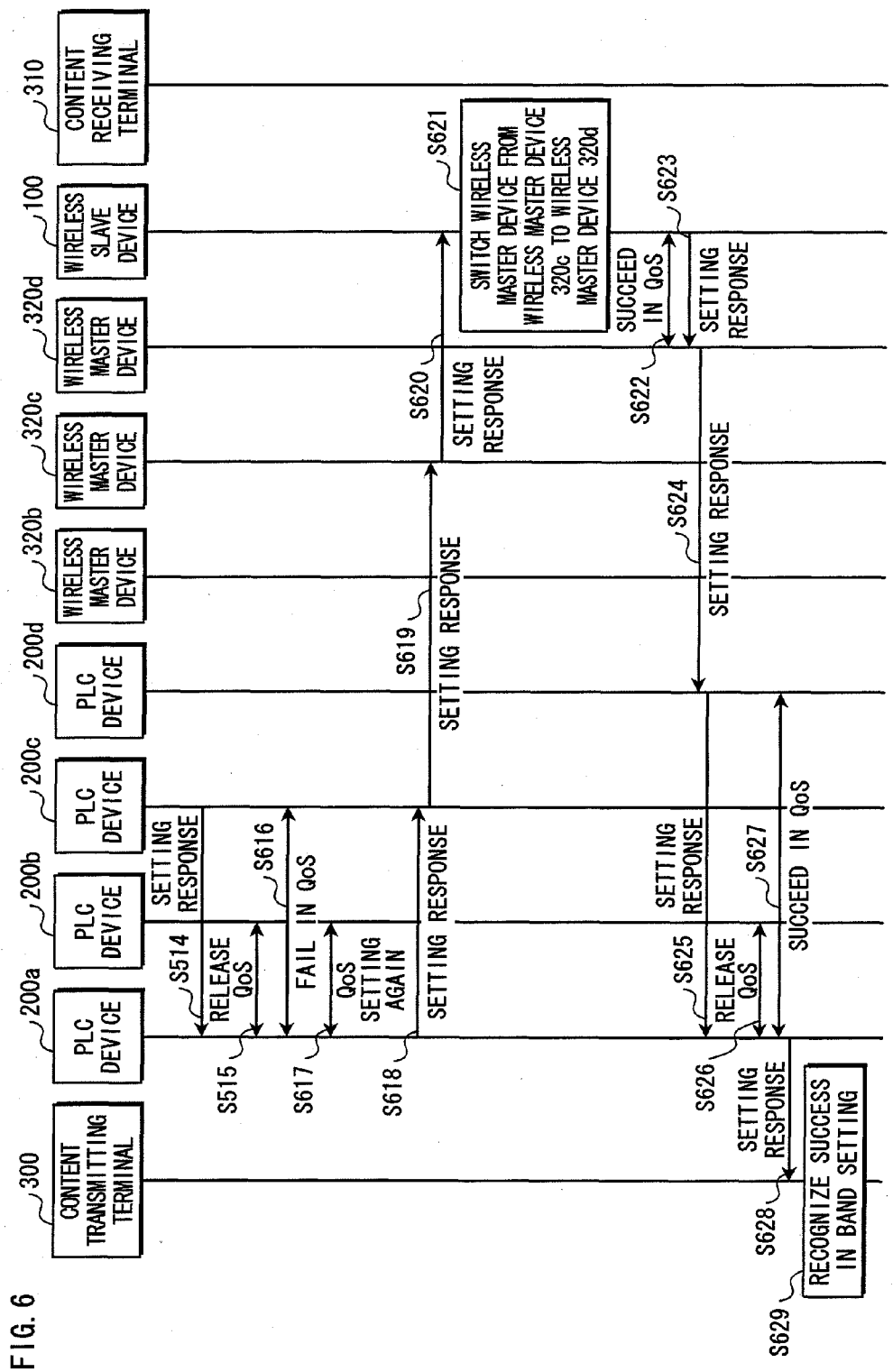
FIG. 6 is a sequence diagram showing communication between the wireless devices after the QoS setting fails in a step S516 in FIG. 5.
Figure 7:
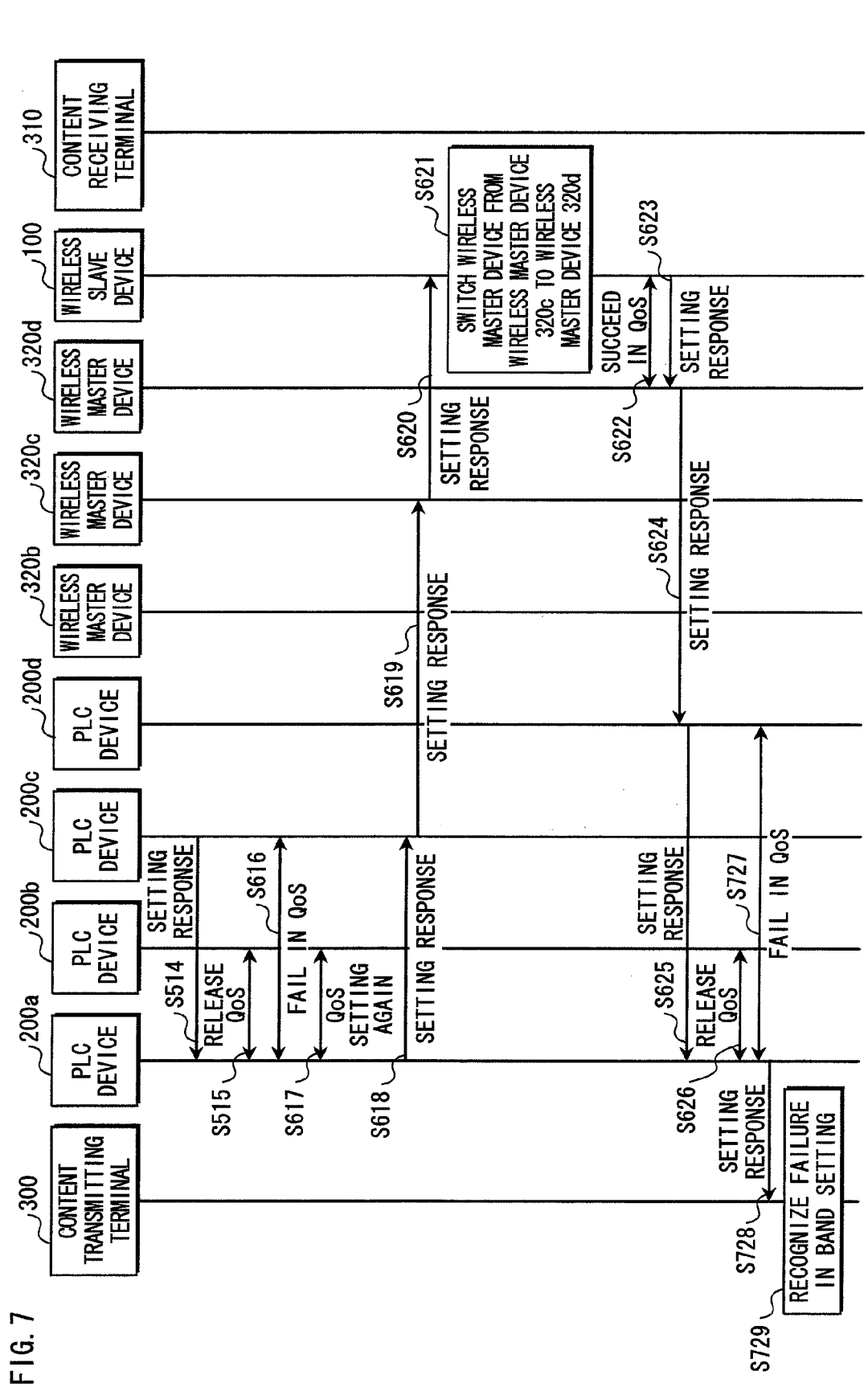
FIG. 7 is a sequence diagram showing communication between the wireless devices after the QoS setting fails in a step S616 in FIG. 6.

The following describes an operation of each of the devices and communication between the devices in the band setting system of the present invention, with reference to communication flows shown in FIGS. 5 to 7.

FIG. 5 shows a communication flow in the band setting system of the present invention. In the following explanation, in order to distinguish each component of the PLC devices 200a to 200d, a wired transmitting/receiving unit of the PLC device 200a is mentioned as a wired transmitting/receiving unit 201a, and a wired transmitting/receiving unit of the PLC device 200b is mentioned as a wired transmitting/receiving unit 201b. In the same manner as this, each component of the wired master devices 320b to 320d is distinguished. Also, "band request" in each of the communication flows is mentioned as "band setting request" in the description, and "setting response" in each of the communication flows is mentioned as "band setting response" in the description. Moreover, the band setting request and the band setting response are basically transmitted from a transmitter side to a substantial end of the network in one direction.

As shown in FIG. 5, when receiving a request of a content from the content receiving terminal 310, the content transmitting terminal 300 transmits a band setting request to the PLC device 200a (step S501). The band setting request includes information about a band necessary for transmitting and receiving the content and the like. More specifically, the band setting request includes fields indicating a content identifier, rate information of the content, information about whether or not a QoS setting between the PLC devices succeeded, and information about whether or not a QoS setting between the wireless master device and the wireless slave device succeeded.

When the wired transmitting/receiving unit 201a of the PLC device 200a receives the band setting request, a data analyzing unit 202a of the PLC device 200a analyzes the received data. When analyzing that the received data is the band setting request based on the analysis, the data analyzing unit 202a transfers the received data to a request processing unit 204a.

The request processing unit 204a analyzes a band data necessary for transmitting and receiving the content from the transferred data, and transfers the band data to be set that is obtained as a result of the analysis to a PLC QoS setting unit 207a. The PLC QoS setting unit 207a requests a PLC QoS requesting unit 208a to perform a QoS setting in the PLC network 160 based on the inputted band data.

The PLC QoS requesting unit 208a makes a PLC QoS setting request based on the band data inputted by the PLC QoS setting unit 207a, transmits the PLC QoS setting request to the PLC device 200b to perform a negotiation with the PLC device 200b, and performs a QoS setting. When a PLC QoS setting response to the PLC QoS setting request is received by a PLC transmitting/receiving unit 203a, content of the PLC QoS setting response is analyzed by the data analyzing unit 202a. When the received data is analyzed to be the PLC QoS setting response, the data is transferred from the data analyzing unit 202a to a PLC QoS responding unit 206a.

The PLC QoS responding unit 206a judges whether or not the QoS setting succeeded based on the transferred data. Then, the PLC QoS responding unit 206a transmits a result of the judgment to the PLC QoS setting unit 207a. The PLC QoS setting unit 207a recognizes whether or not the QoS setting succeeded based on the transferred result of the judgment. Here, supposed that the QoS setting succeeded (step S502).

The PLC QoS setting unit 207a transfers information indicating that the QoS setting succeeded to the request processing unit 204a. The request processing unit 204a writes the information indicating that the QoS setting succeeded in the band setting request and transfers the band setting request to the PLC transmitting/receiving unit 203a. Then, the PLC transmitting/receiving unit 203a transmits the transferred band setting request to the PLC device 200b (step S503).

A data analyzing unit 202b of the PLC device 200b analyzes the data received by a PLC transmitting/receiving unit 203b. When analyzing that the received data is the band setting request, the data analyzing unit 202b transfers the data to a request processing unit 204b. When recognizing that the transferred data is the band setting request, the request processing unit 204b transfers the information included in the band setting request to a PLC QoS setting unit 207b.

When recognizing that the transferred data is the band setting request, the PLC QoS setting unit 207b transfers information indicating that the QoS setting has been performed to the request processing unit 204b based on the information indicating that the QoS setting succeeded with the PLC device 200a. The request processing unit 204b transfers the band setting request to the wired transmitting/receiving unit 201b, and the wired transmitting/receiving unit 201b transmits the band setting request to the wireless master device 320b (step S504).

When receiving the band setting request, the wireless master device 320b transmits the band setting request to the wireless slave device 100 (step S505).

When the wireless transmitting/receiving unit 103 of the wireless slave device 100 receives the band setting request, the data analyzing unit 102 of the wireless slave device 100 analyzes the received data. When analyzing that the received data is the band setting request, the data analyzing unit 102 transfers the data to the request processing unit 104. When the band setting request is inputted to the request processing unit 104, the request processing unit 104 transfers the data having the necessary band included in the band setting request to the wireless QoS setting unit 107. The wireless QoS setting unit 107 requests the wireless QoS requesting unit 108 to perform a wireless QoS setting with the wireless master device 320b based on the transferred data having the necessary band.

When receiving the request to perform the wireless QoS setting, the wireless QoS requesting unit 108 makes a band setting request, performs a negotiation with the wireless master device 320b via the wireless transmitting/receiving unit 103, and performs the wireless QoS setting. As mentioned above, the wireless QoS setting is performed by the HCCA method. The wireless transmitting/receiving unit 103 transfers a wireless QoS setting response transmitted from the wireless master device 320b to the data analyzing unit 102.

Because the data transferred from the wireless transmitting/receiving unit 103 is the wireless QoS setting response, the data analyzing unit 102 transfers the wireless QoS setting response to the wireless QoS responding unit 106. Then, the wireless QoS responding unit 106 judges whether or not the wireless QoS setting can be performed based on information included in the wireless QoS setting response. Also, the information indicates whether or not the wireless QoS setting can be performed. The wireless; QoS responding unit 106 transfers a result of the judgment to the wireless QoS setting unit 107, and the wireless QoS setting unit 107 recognizes whether or not the wireless QoS setting succeeded. Here, suppose that the wireless master device 320*b* could not assign a predetermined band for transmitting and receiving the content to the wireless slave device 100, and the wireless QoS setting failed (step S506).

Then, the wireless QoS setting unit 107 requests the wireless master device managing unit 111 to switch the connection destination to a new connectable wireless master device, based on information indicating that the wireless QoS setting failed. When receiving the request, the wireless master device managing unit ill searches the new connectable wireless master device based on beacon signals from wireless master devices received by the wireless transmitting/receiving unit 103. More specifically, the wireless master device managing unit 111 searches the new connectable wireless master device based on whether or not a receiving electric field strength of each of the beacon signals exceeds a predetermined threshold value. Here, suppose that a receiving electric field strength of each of beacon signals from the wireless master devices 320*c* and 320*d* exceeds the predetermined threshold value. Also, the receiving electric field strength of the beacon signal from the wireless master device 320*c* is higher than the receiving electric field strength of the beacon signal from the wireless master device 320*d*.

Then, the wireless master device managing unit 111 instructs the wireless master device switching unit 112 to switch the wireless connection destination to the wireless master device 320*c* that transmits the beacon signal having the highest receiving electric field strength out of the searched wireless master devices. When receiving the instruction, the wireless master device switching unit 112 switches the connection destination in a wireless network 170 from the wireless master device 320*b* to the wireless master device 320*c*, and then returns a switch completion notification to the wireless master device managing unit 111 (step S507).

When receiving the switch completion notification, the wireless master device managing unit 111 updates the connection flag of the wireless master device 320*c* in the connection table from 0 to 1 as shown in FIGS. 4A and 4B. After updating the connection flag, the wireless master device managing unit 111 notifies the wireless QoS setting unit 107 that the switch of the wireless master devices has been completed. When receiving the switch completion notification, the wireless QoS setting unit 107 requests the wireless QoS requesting unit 108 to perform the QoS resetting with the wireless master device 320*c*.

The wireless QoS requesting unit 108 makes a wireless QoS setting request based on data for the wireless QoS setting notified from the wireless QoS setting unit 107, performs a negotiation with the wireless master device 320*c* via the wireless transmitting/receiving unit 103, and performs the wireless QoS setting in the wireless network 170. When receiving a wireless QoS setting response to the wireless QoS setting request from the wireless master device 320*c*, the wireless transmitting/receiving unit 103 transfers the wireless QoS setting response to the data analyzing unit 102.

When analyzing that the transferred data is the wireless QoS setting response, the data analyzing unit 102 transfers the wireless QoS setting response to the wireless QoS responding unit 106. The wireless QoS responding unit 106 extracts information that is included in the wireless QoS setting response and indicates whether or not the wireless QoS responding succeeded, and transfers the extracted information to the wireless QoS setting unit 107. Then, the wireless QoS setting unit 107 judges whether or not the wireless QoS setting succeeded based on the transferred data. Here, suppose that the wireless master device 320*c* could assign the band requested by the wireless slave device 100 to the wireless slave device 100, and the wireless QoS setting succeeded (step S508). Note that when the wireless QoS setting failed, the wireless slave device 100 searches a next wireless master device.

The wireless QoS setting unit 107 transfers a result of the judgment indicating that the QoS setting succeeded to the request processing unit 104. When receiving the judgment result, the request processing unit 104 writes information indicating that the QoS setting succeeded in the band setting request, and transfers the band setting request to the wired transmitting/receiving unit 101. Then, the wired transmitting/receiving unit 101 transmits the band setting request to the content receiving terminal 310 (step S509).

The content receiving terminal 310 returns a band setting response including the judgment result of the QoS setting included in the band setting request (step S510).

When receiving the band setting response, the wired transmitting/receiving unit 101 transfers the band setting response to the data analyzing unit 102. When analyzing that the transferred data is the band setting response, the data analyzing unit 102 transfers the band setting response to the response processing unit 105. The response processing unit 105 confirms the information that is included in the band setting response and indicates whether or not the QoS setting succeeded. Here, the information indicates "success". Therefore, the response processing unit 105 transfers the band setting response to the path switch information setting unit 109. Note that when the information indicates "failure", the response processing unit 105 instructs the wireless QoS setting unit 107 to release the QoS setting, and the wireless QoS setting unit 107 requests the wireless master device 320*c* to release the QoS setting.

When receiving the band setting response, the path switch information setting unit 109 transfers a content identifier included in the band setting response to the wireless QoS setting unit 107. When the content identifier is inputted to the wireless QoS setting unit 107, the wireless QoS setting unit 107 transfers, to the path switch information setting unit 109, information indicating whether or not the wireless master device has been switched when the QoS setting of the content is performed, and information indicating the wireless master device before the switching and the wireless master device after the switching. Here, the wireless QoS setting unit 107 notifies the path switch information setting unit 109 that the wireless connection destination is switched from the wireless master device 320*b* to the wireless master device 320*c*.

When receiving the notification, the path switch information setting unit 109 adds, to the band setting response, path switch information indicating that the wireless connection destination is switched from the wireless master device 320*b* to the wireless master device 320*c*. Then, the path switch information setting unit 109 transfers the band setting response to which the path switch information is added to the wireless master device setting unit 110. When the path switch information is added to the inputted band setting response, the wireless master device setting unit 110 transfers the content identifier included in the band setting response to the wireless master device managing unit 111.

When the content identifier is inputted to the wireless master device managing unit 111, the wireless master device managing unit 111 detects whether or not there is a wireless master device whose connection flag corresponding to the content identifier in the connection table is "0". In other words, the wireless master device managing unit 111 detects whether or not there is a wireless master device to which the wireless slave device 100 can be wirelessly connected, and to which the wireless slave device 100 has not been connected. When there is a wireless master device to which the wireless slave device 100 has not been connected, the wireless master device managing unit 111 notifies the wireless master device setting unit 110 that there is the unconnected wireless master device. Here, a connection flag of the wireless master device 320d is "0". Therefore, the wireless master device managing unit 111 notifies the wireless master device setting unit 110 that there is the unconnected wireless master device. The wireless master device setting unit 110 adds information indicating that there is the unconnected wireless master device to the band setting response, and transfers the band setting response to the wireless transmitting/receiving unit 103. Then, the wireless transmitting/receiving unit 103 transmits the band setting response to the wireless master device 320c (step S512).

When receiving the band setting response, the wireless master device 320c transmits the band setting response to the PLC device 200c to which the wireless master device 320c is connected (step S513).

When receiving the band setting response, a wired transmitting/receiving unit 201c of the PLC device 200c transfers the band setting response to a data analyzing unit 202c. When analyzing that the received data is the band setting response, the data analyzing unit 202c transfers the band setting response to a response processing unit 205c. Then, the response processing unit 205c confirms the information that is included in the band setting response and indicates whether or not the QoS setting succeeded. Here, the information indicates "success". Therefore, the response processing unit 205c transfers the band setting response to a path switch information analyzing unit 209c. The path switch information analyzing unit 209c analyzes the path switch information added to the transferred band setting response.

When analyzing that the wireless connection destination of the wireless slave device 100 is switched from the wireless master device 320b to the wireless master device 320c based on the path switch information, the path switch information analyzing unit 209c requests a PLC QoS setting unit 207c to perform the QoS resetting in the PLC network 160. This is because the QoS setting is not performed between the PLC device 200c and the PLC device 200a.

However, the PLC device 200a has performed the band setting with the PLC device 200b, with regard to the content identifier included in the band setting response. Therefore, the PLC device 200c cannot perform the QoS setting with the PLC device 200a, with regard to the content. Thus, the PLC QoS setting unit 207c transfers information indicating that the PLC device 200c has not performed the QoS setting to the path switch information analyzing unit 209c without performing the QoS resetting. When receiving the information, the path switch information analyzing unit 209c transfers the band setting response to a PLC transmitting/receiving unit 203c, and the PLC transmitting/receiving unit 203c transmits the band setting response to the PLC device 200a (step S514).

When receiving the band setting response, the PLC transmitting/receiving unit 203a of the PLC device 200a transfers the band setting response to the data analyzing unit 202a. When analyzing that the received data is the band setting response, the data analyzing unit 202a transfers the band setting response to a response processing unit 205a. The response processing unit 205a extracts the information indicating whether or not the QoS setting succeeded from the transferred band setting response. Here, the response processing unit 205a analyzes that the information indicates "success", and transfers the band setting response to a path switch information analyzing unit 209a.

When the band setting response is inputted to the path switch information analyzing unit 209a, the path switch information analyzing unit 209a analyzes the path switch information included in the band setting response. When recognizing that the wireless master device has been switched by the wireless slave device 100 after analyzing the path switch information, the path switch information analyzing unit 209a instructs the PLC QoS setting unit 207a to perform the QoS resetting in the PLC network 160. When receiving the instruction, the PLC QoS setting unit 207a releases the QoS setting of the content with the PLC device 200b because the QoS setting of the content has been performed with the PLC device 200b (step S515).

After releasing the QoS setting, the PLC QoS setting unit 207a performs the QoS setting of the content with the PLC device 200c in the same manner as with the PLC device 200b. Here, suppose that the QoS setting succeeded (step S516).

Then, the PLC QoS setting unit 207a transfers the information indicating whether or not the QoS setting succeeded to the path switch information analyzing unit 209a. The path switch information analyzing unit 209a writes the information indicating whether or not the QoS setting succeeded in the band setting response. Note that the information indicates "success" here. Then, the path switch information analyzing unit 209a transfers the band setting response to the wired transmitting/receiving unit 201a, and the wired transmitting/receiving unit 201a transmits the band setting response to the content transmitting terminal 300 (step S517).

Then, the content transmitting terminal 300 analyzes the transmitted band setting response and recognizes that the QoS setting succeeded (step S518). After that, the content transmitting terminal 300 starts transmitting the content.

The above is the operation of each of the devices in the communication flow shown in FIG. 5. In the step S507 in FIG. 5, the wireless slave device 100 switches the wireless connection destination from the wireless master device 320b to the wireless master device 320c when the wireless slave device 100 cannot perform the requested QoS setting with the wireless master device 320b. This is a great feature of the present invention. Because the wireless slave device itself switches the connection destination, a management device such as the manager disclosed by the patent document 2 is not necessary. Also, a new transmission path of a content can be searched by switching wireless connection destinations.

The following describes an operation of each of the devices in the band setting system when the QoS setting failed in the step S516 in the above communication flow with reference to a communication flow shown in FIG. 6. Since the operations from the steps S501 to S515 are same as in FIG. 5, the explanation thereof will be omitted and operations of each of the devices after the step S515 will be described, with reference to the communication flow shown in FIG. 6.

Suppose that the PLC QoS setting unit 207a of the PLC device 200a failed to perform the QoS setting with the PLC device 200c (step S616).

Then, the PLC QoS setting unit 207a performs the QoS resetting with the PLC device 200b (step S617).

When failing to perform the QoS setting with the PLC device 200b, the PLC QoS setting unit 207a transfers the band setting response to the wireless master device analyzing unit 210a. The wireless master device analyzing unit 210a analyzes the information about the connectable wireless master devices, which is included in the transferred band setting response and added by the wireless slave device 100. Here, the information indicates that there is an unconnected wireless master device to which the wireless slave device 100 can be connected. Therefore, the wireless master device analyzing unit 210*a* transfers the band setting response to the PLC transmitting/receiving unit 203*a* to return the band setting response to the PLC device 200*c*. Then, the PLC transmitting/receiving unit 203*a* transmits the band setting response to the PLC device 200*c* (step S618).

When the PLC transmitting/receiving unit 203*c* of the PLC device 200*c* receives the band setting response, the data analyzing unit 202*c* of the PLC device 200*c* analyzes that the received data is the band setting response, and then transfers the band setting response to the response processing unit 205*c*. The response processing unit 205*c* analyzes the band setting response and judges whether or not the QoS setting succeeded. Here, "success" is written in the band setting response. Therefore, the response processing unit 205*c* transfers the band setting response to the path switch information analyzing unit 209*c*.

When analyzing that the wireless slave device 100 has switched the wireless master devices, the path switch information analyzing unit 209*c* instructs the PLC QoS setting unit 207*c* to perform the QoS resetting. Although the PLC QoS setting unit 207*c* receives the instruction, the PLC QoS setting unit 207*c* transfers information indicating that the QoS setting has not been performed to the path switch information analyzing unit 209*c*, because the PLC device 200*c* has not performed the QoS setting. When receiving the notification indicating that the QoS setting has not been performed, the path switch information analyzing unit 209*c* transfers the band setting response to the wired transmitting/receiving unit 201*c* because the band setting response is received from the PLC devices 200*a*, and the wired transmitting/receiving unit 201*c* transmits the band setting response to the wireless master device 320*c* (step S619).

When receiving the band setting response, the wireless master device 320*c* transmits the band setting response to the wireless slave device 100 (step S620).

When the wireless transmitting/receiving unit 103 of the wireless slave device 100 receives the band setting response, the data analyzing unit 102 of the wireless slave device 100 analyzes the band setting response, and transfers the band setting response to the response processing unit 105. The response processing unit 105 judges information that is included in the band setting response and indicates whether or not the QoS setting succeeded. Because the response processing unit 105 judges that the information indicates "success" here, the response processing unit 105 transfers the band setting response to the path switch information setting unit 109. When receiving the band setting response and detecting the path switch information added to the band setting response by the wireless slave device 100, the path switch information setting unit 109 recognizes that the QoS setting could not be performed in the upstream of the network (between the PLC device 200*a* and the PLC device 200*c* here), and instructs the wireless QoS setting unit 107 to switch the wireless master device and perform the QoS setting.

When receiving the instruction of switching the wireless master device and performing the QoS setting from the path switch information setting unit 109, the wireless QoS setting unit 107 firstly instructs the wireless master device managing unit 111 to switch the wireless master device. When receiving the instruction of switching the wireless master device, the wireless master device managing unit 111 searches the connection table to detect a wireless master device whose connection flag is "0" with regard to the content. Then, the wireless master device managing unit 111 instructs the wireless master device switching unit 112 to switch the wireless connection destination to the wireless master device 320*d* whose connection flag is "0", which is obtained as a result of the search.

When receiving the instruction, the wireless master device switching unit 112 switches the wireless connection destination from the wireless master device 320*c* to the wireless master device 320*d*. Then, the wireless master device switching unit 112 updates the connection flag of the wireless master device 320*d* from "0" to "1", and transfers a switch completion notification indicating that the switch of the wireless master devices has been completed to the wireless master device managing unit 111 (step S621).

When receiving the switch completion notification, the wireless master device managing unit 111 requests the wireless QoS requesting unit 108 to perform the QoS setting in the wireless network 170. When receiving the request, the wireless QoS requesting unit 108 makes a wireless QoS setting request based on information of a requested band, performs a negotiation with the wireless master device 320*d* via the wireless transmitting/receiving unit 103, and performs the QoS setting in the wireless network 170.

When receiving a response to the wireless QoS setting request from the wireless master device 320*d*, the wireless transmitting/receiving unit 103 inputs the response to the data analyzing unit 102. Then, the data analyzing unit 102 transfers the response to the wireless QoS setting unit 107. The wireless QoS setting unit 107 judges whether or not the QoS setting succeeded based on the information included in the response. Here, suppose that the QoS setting succeeded (step S622).

The wireless QoS setting unit 107 transfers the information indicating that the QoS setting succeeded to the path switch information setting unit 109. Then, the path switch information setting unit 109 writes the information indicating that the QoS setting succeeded in the band setting response, and transfers the band setting response to the wireless master device setting unit 110. When the band setting response is inputted to the wireless master device setting unit 110, the wireless master device setting unit 110 detects information indicating whether or not the wireless master device is switched in the band setting response. When the information indicates that the wireless master device has been switched, the wireless master device setting unit 110 transfers a content identifier included in the band setting response to the wireless master device managing unit 111.

When the content identifier is inputted to the wireless master device managing unit 111, the wireless master device managing unit 111 searches the corresponding connection table to detect a wireless master device corresponding to the content and whose connection flag is "0". Here, the wireless master device whose connection flag is "0" is not detected. Therefore, the wireless master device managing unit 111 notifies the wireless master device setting unit 110 that there is no unconnected wireless master device. The wireless master device setting unit 110 adds information indicating that there is no unconnected wireless master device to the band setting response, and transfers the band setting response to the wireless transmitting/receiving unit 103. Then, the wireless transmitting/receiving unit 103 transmits the band setting response to the wireless master device 320*d* (step S623).

When receiving the band setting response, the wireless master device 320*d* transmits the band setting response to the PLC device 200*d* (step S624).

When receiving the band setting response, a wired transmitting/receiving unit 201*d* of the PLC device 200*d* transfers the band setting response to a data analyzing unit 202d. When analyzing that the received data is the band setting response, the data analyzing unit 202d transfers the band setting response to a response processing unit 205d. Then, the response processing unit 205d confirms the information that is included in the band setting response and indicates whether or not the QoS setting succeeded. Here, the information indicates "success". Therefore, the response processing unit 205d transfers the band setting response to a path switch information analyzing unit 209d.

The path switch information analyzing unit 209d analyzes the path switch information added to the transferred band setting response. When analyzing that the wireless connection destination of the wireless slave device 100 has been switched from the wireless master device 320c to the wireless master device 320d based on the path switch information, the path switch information analyzing unit 209d requests a PLC QoS setting unit 207d to perform the QoS resetting in the PLC network 160. This is because the QoS setting is not performed between the PLC device 200d and the PLC device 200a.

However, the PLC device 200a has performed the band setting with the PLC device 200b, with regard to the content identifier included in the band setting response. Therefore, the PLC device 200d cannot perform the QoS setting with the PLC device 200a, with regard to the content. Thus, the PLC QoS setting unit 207d transfers information indicating that the QoS setting has not been performed in the PLC device 200d to the path switch information analyzing unit 209d without performing the QoS resetting. When receiving the information, the path switch information analyzing unit 209d transfers the band setting response to a PLC transmitting/receiving unit 203d, and the PLC transmitting/receiving unit 203d transmits the band setting response to the PLC device 200a (step S625).

When receiving the band setting response, the PLC transmitting/receiving unit 203a of the PLC device 200a transfers the band setting response to the data analyzing unit 202a. When analyzing that the received data is the band setting response, the data analyzing unit 202a transfers the band setting response to the response processing unit 205a. The response processing unit 205a extracts the information indicating whether or not the QoS setting succeeded from the transferred band setting response. Here, the response processing unit 205a analyzes that the information indicates "success", and transfers the band setting response to the path switch information analyzing unit 209a.

When the band setting response is inputted to the path switch information analyzing unit 209a, the path switch information analyzing unit 209a analyzes the path switch information included in the band setting response. When recognizing that the wireless master device has been switched by the wireless slave device 100 after analyzing the path switch information, the path switch information analyzing unit 209a instructs the PLC QoS setting unit 207a to perform the QoS resetting in the PLC network 160. When receiving the instruction, the PLC QoS setting unit 207a releases the QoS setting of the content with the PLC device 200b because the QoS setting of the content has been performed with the PLC device 200b (step S626).

After releasing the QoS setting, the PLC QoS setting unit 207a performs the QoS setting of the content with the PLC device 200d in the same manner as with the PLC device 200b. Here, suppose that the QoS setting succeeded (step S627).

Then, the PLC QoS setting unit 207a transfers the information indicating whether or not the QoS setting succeeded to the path switch information analyzing unit 209a. The path switch information analyzing unit 209a writes the information indicating whether or not the QoS setting succeeded in the band setting response. Note that the information indicates "success" here. Then, the path switch information analyzing unit 209a transfers the band setting response to the wired transmitting/receiving unit 201a, and the wired transmitting/receiving unit 201a transmits the band setting response to the content transmitting terminal 300 (step S628).

Then, the content transmitting terminal 300 analyzes the transmitted band setting response and recognizes that the QoS setting succeeded (step S629). After that, the content transmitting terminal 300 starts transmitting the content.

Finally, a case in which a band setting fails will be described based on a communication flow shown in FIG. 7. This communication flow is same as the communication flow shown in FIG. 6 until the step S626 in which the PLC device 200a releases the QoS setting with the PLC device 200b. Therefore, the explanation of the operation until the step S626 will be omitted, and an operation after the step S626 will be described here.

The PLC QoS setting unit 207a of the PLC device 200a releases the QoS setting with the PLC device 200b (step S626).

After releasing the QoS setting, the PLC QoS setting unit 207a performs the QoS setting of the content with the PLC device 200d in the same manner as with the PLC device 200b. Here, suppose that the QoS setting failed (step S727).

Then, the PLC QoS setting unit 207a transfers a result of the judgment whether or not the QoS setting succeeded, i.e. information indicating that the QoS setting failed to the path switch information analyzing unit 209a. When the judgment result indicates that the QoS setting failed, the path switch information analyzing unit 209a transfers the band setting response to the wireless master device analyzing unit 210a. When the band setting response is transferred to the wireless master device analyzing unit 210a, the wireless master device analyzing unit 210a analyzes information that is added by the wireless slave device 100 and indicates whether or not there is an unconnected wireless master device to which the wireless slave device 100 can be connected.

As explained in the operation of the wireless slave device 100 in the step S623 in FIG. 6, the wireless master device analyzing unit 210a analyzes that the information indicates there is no unconnected wireless master device to which the wireless slave device 100 can be connected. Then, the path switch information analyzing unit 209a adds the information indicating that the QoS setting failed to the band setting response, and transmits the band setting response to the content transmitting terminal 300 via the wired transmitting/receiving unit 201a (step S728).

The content transmitting terminal 300 analyzes the transmitted band setting response and recognizes that the band setting failed.

As shown in FIG. 7, when the QoS setting cannot be performed in all searchable paths, a content cannot be transmitted or received. Therefore, the band resetting may be performed later.

However, when the wireless slave device cannot perform the QoS setting with the wireless master device, the wireless slave device searches a new wireless master device and tries to perform the QoS setting with the searched wireless master device in the first embodiment. Therefore, a new path for transmitting and receiving a content can be searched and the QoS setting can be performed in the new path. As a result, a probability of receiving a content can be increased more than a conventional technology.

<Second Embodiment>

In the first embodiment, when the setting between the PLC devices fails, the PLC devices suggest a new path to the wireless slave device. In a second embodiment, after the wireless slave device switches wireless master devices to perform a band setting, the processing in a case in which the QOS setting fails between the PLC devices connected to the wireless master device after the switch is performed by a content transmitting terminal instead of the PLC device.

<Structure>

Figure 8:
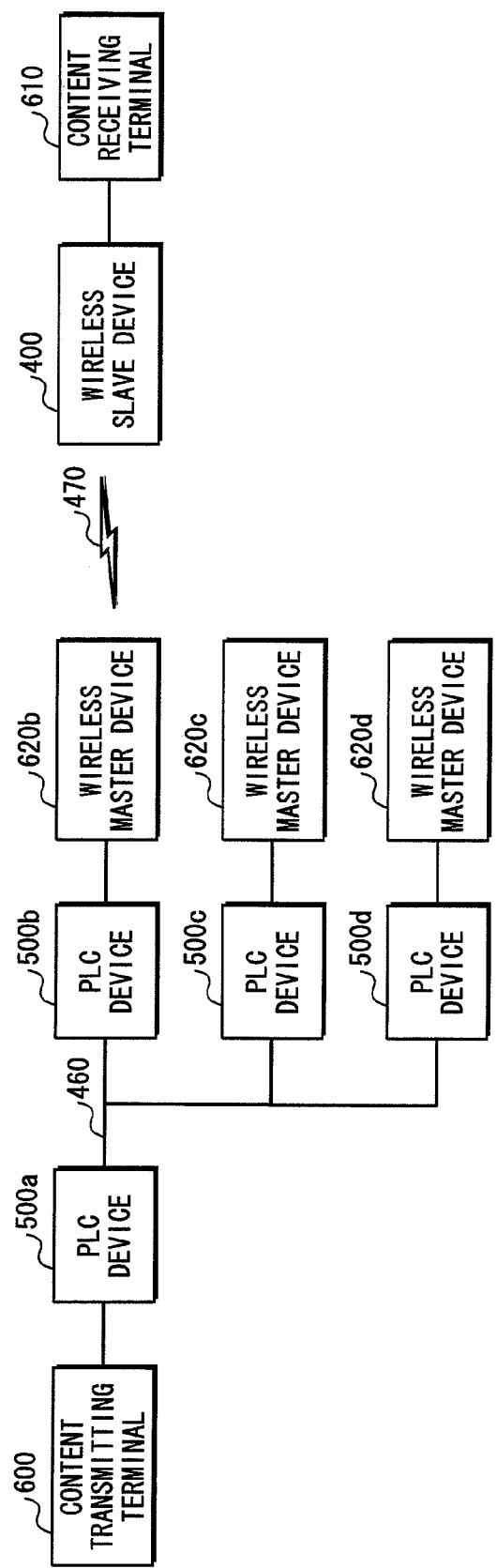
FIG. 8 is a system diagram showing a structure of a band setting system of a second embodiment.

FIG. 8 is a system diagram showing a structure of a band setting system of the second embodiment. As shown in FIG. 8, the band setting system includes a wireless slave device 400, PLC devices 500a, 500b, 500c, 500d, a content transmitting terminal 600, a content receiving terminal 610, wireless master devices 620b, 620c, and 620d. This system structure is basically same as the structure shown in the first embodiment. Therefore, an explanation of the same structure will be omitted or simplified, and only a structure different from the first embodiment will be described.

Figure 9:
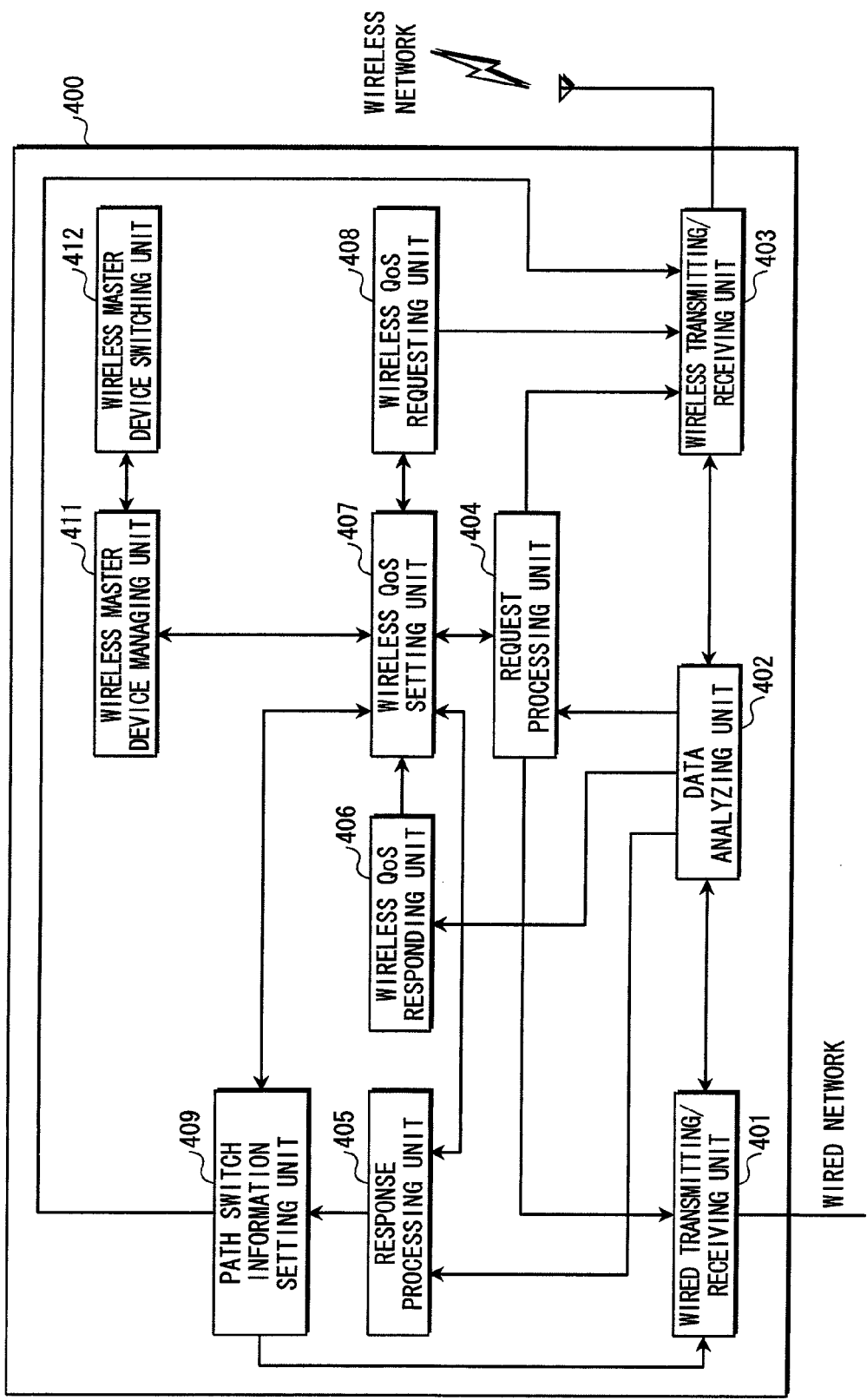
FIG. 9 is a functional block diagram showing a functional structure of a wireless slave device of the second embodiment.

The following describes a function of the wireless slave device 400 of the second embodiment. More specifically, a function of the wireless slave device 400 different from the function of the wireless slave device 100 will be described. As shown in FIG. 9, the wireless slave device 400 includes a wired transmitting/receiving unit 401, a data analyzing unit 402, a wireless transmitting/receiving unit 403, a request processing unit 404, a response processing unit 405, a wireless QoS responding unit 406, a wireless QoS setting unit 407, a wireless QoS requesting unit 408, a path switch information setting unit 409, a wireless master device managing unit 411, and a wireless master device switching unit 412. Each of the above components of the wireless slave device 400 is connected as shown in FIG. 9.

The wireless slave device 400 is different from the wireless slave device 100 in that the wireless slave device 400 does not include a wireless master device setting unit as a structural component. The structural components in the wireless slave device 400 having the same names as in the wireless slave device 100 other than the wireless master device setting unit have the same functions as in the first embodiment. Therefore, the explanation thereof will be omitted.

Figure 10:
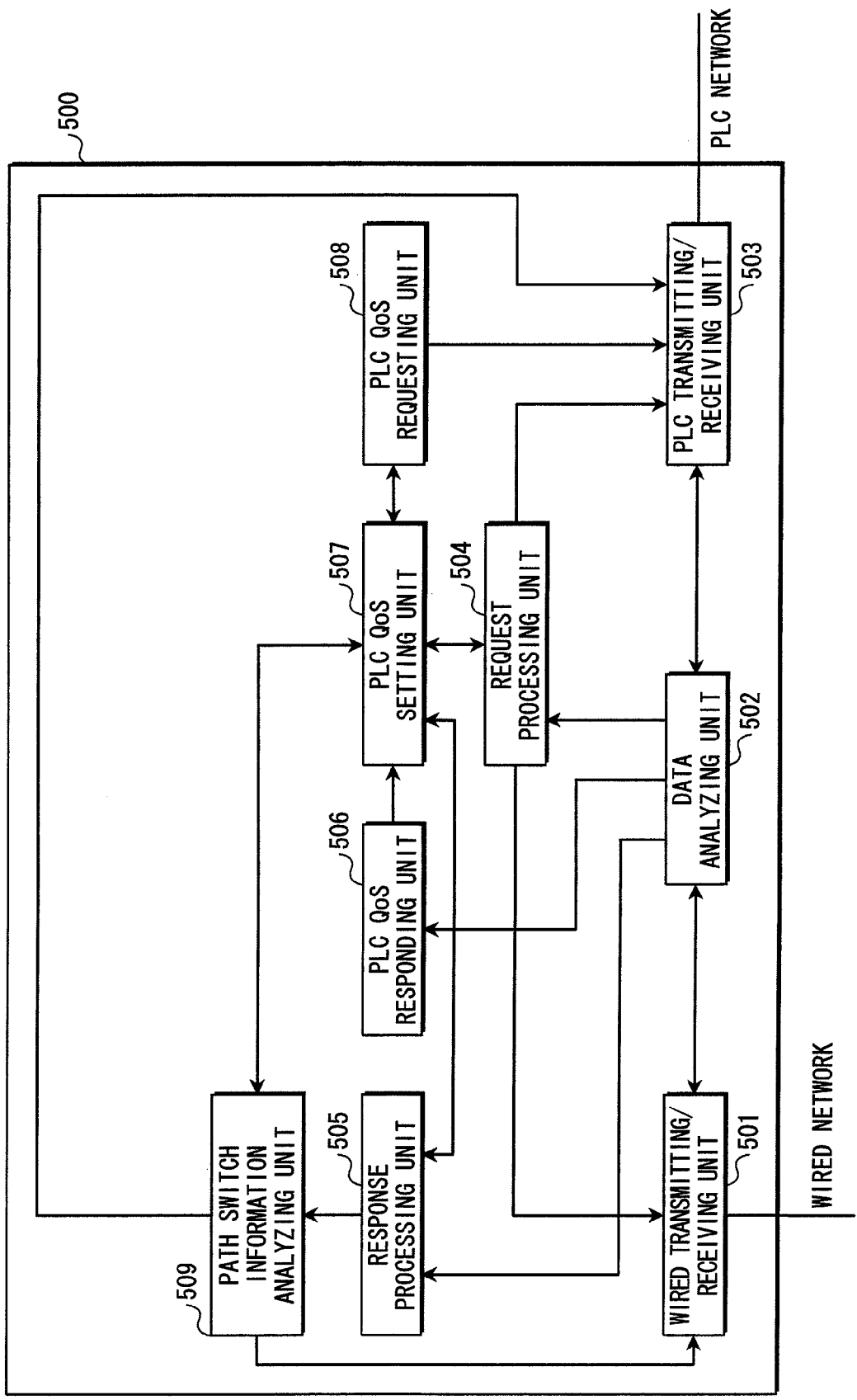
FIG. 10 is a functional block diagram showing a functional structure of a PLC device of the second embodiment.

The following describes the PLC devices 500a to 500d. Here, the PLC devices 500a to 500d are collectively called a PLC device 500. FIG. 10 is a functional block diagram showing a functional structure of the PLC device 500. As shown in FIG. 10, the PLC device 500 includes a wired transmitting/receiving unit 501, a data analyzing unit 502, a PLC transmitting/receiving unit 503, a request processing unit 504, a response processing unit 505, a PLC QoS responding unit 506, a PLC QoS setting unit 507, a PLC QoS requesting unit 508, and a path switch information analyzing unit 509. Each of the above components of the PLC device 500 is connected as shown in FIG. 10.

The PLC device 500 is different from the PLC device 200 in that the PLC device 500 does not include a wireless master device analyzing unit as a structural component. The structural components in the PLC device 500 having the same names as in the PLC device 200 other than the wireless master device analyzing unit have the same functions as in the first embodiment. Therefore, the explanation thereof will be omitted.

Figure 11:
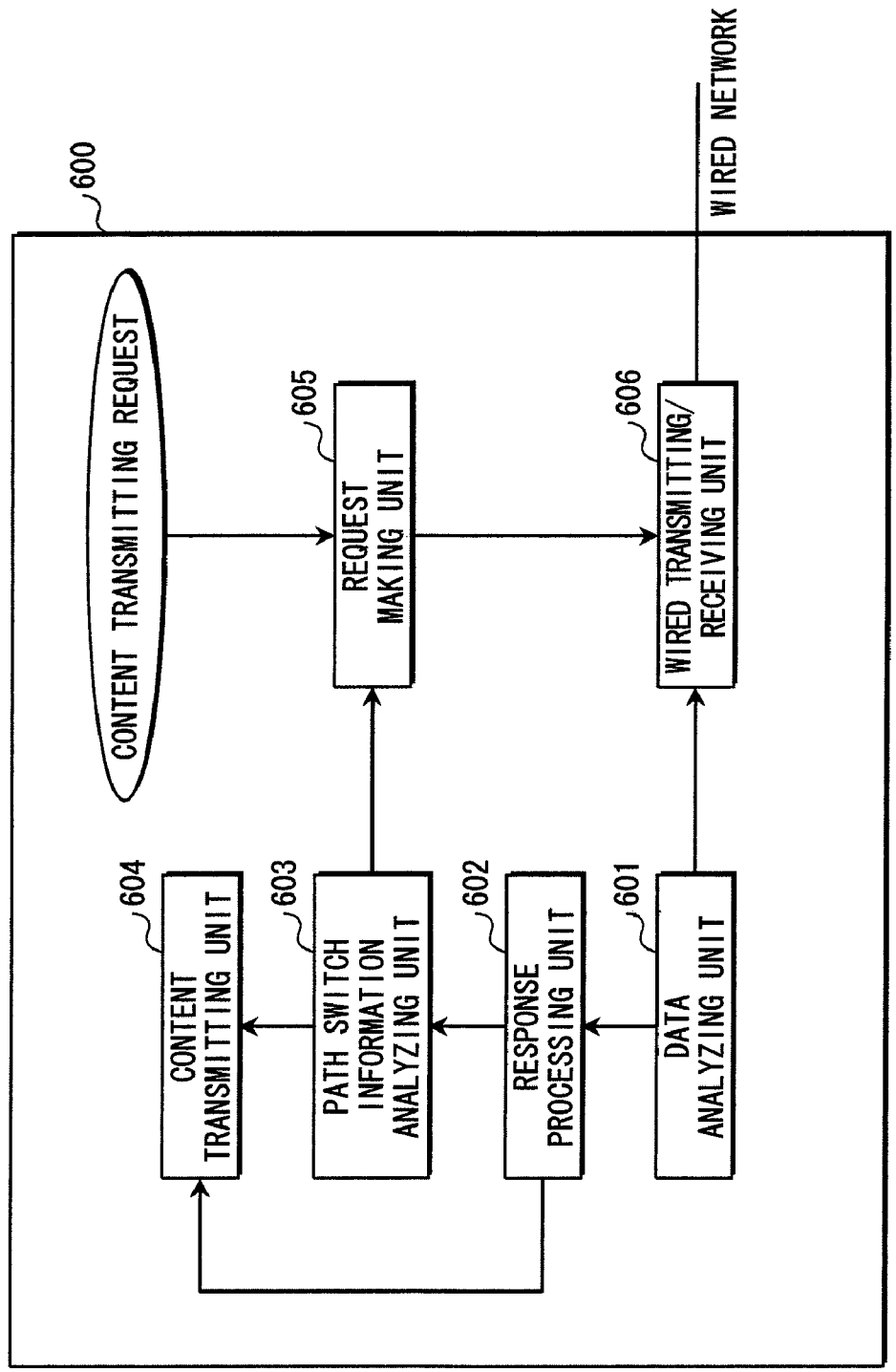
FIG. 11 is a functional block diagram showing a functional structure of a content transmitting terminal of the second embodiment.

FIG. 11 is a functional block diagram showing a functional structure of the content transmitting terminal 600. As shown in FIG. 11, the content transmitting terminal 600 includes a data analyzing unit 601, a response processing unit 602, a path switch information analyzing unit 603, a content transmitting unit 604, a request making unit 605, and a wired transmitting/receiving unit 606.

The data analyzing unit 601 analyzes content of data inputted to the wired transmitting/receiving unit 606. When the inputted data is a band setting response, the data analyzing unit 601 transfers the band setting response to the response processing unit 602.

The response processing unit 602 performs processing of the band setting response.

The path switch information analyzing unit 603 analyzes path switch information indicating that the wireless slave device 400 switches the wireless master devices, when the path switch information is added to the band setting response.

The content transmitting unit 604 transmits a content when a band setting succeeds in a path from the content transmitting terminal 60Q to the content receiving terminal 610.

The request making unit 605 makes a band setting request when receiving a content transmitting request from a high-order application (not shown), and outputs the band setting request to the PLC device 500a via the wired transmitting/receiving unit 606.

The wired transmitting/receiving unit 606 demodulates data inputted from a wired network and transfers the demodulated data to the data analyzing unit 601. Also, the wired transmitting/receiving unit 606 modulates data transmitted to the wired network.

<Operation>

Figure 12:
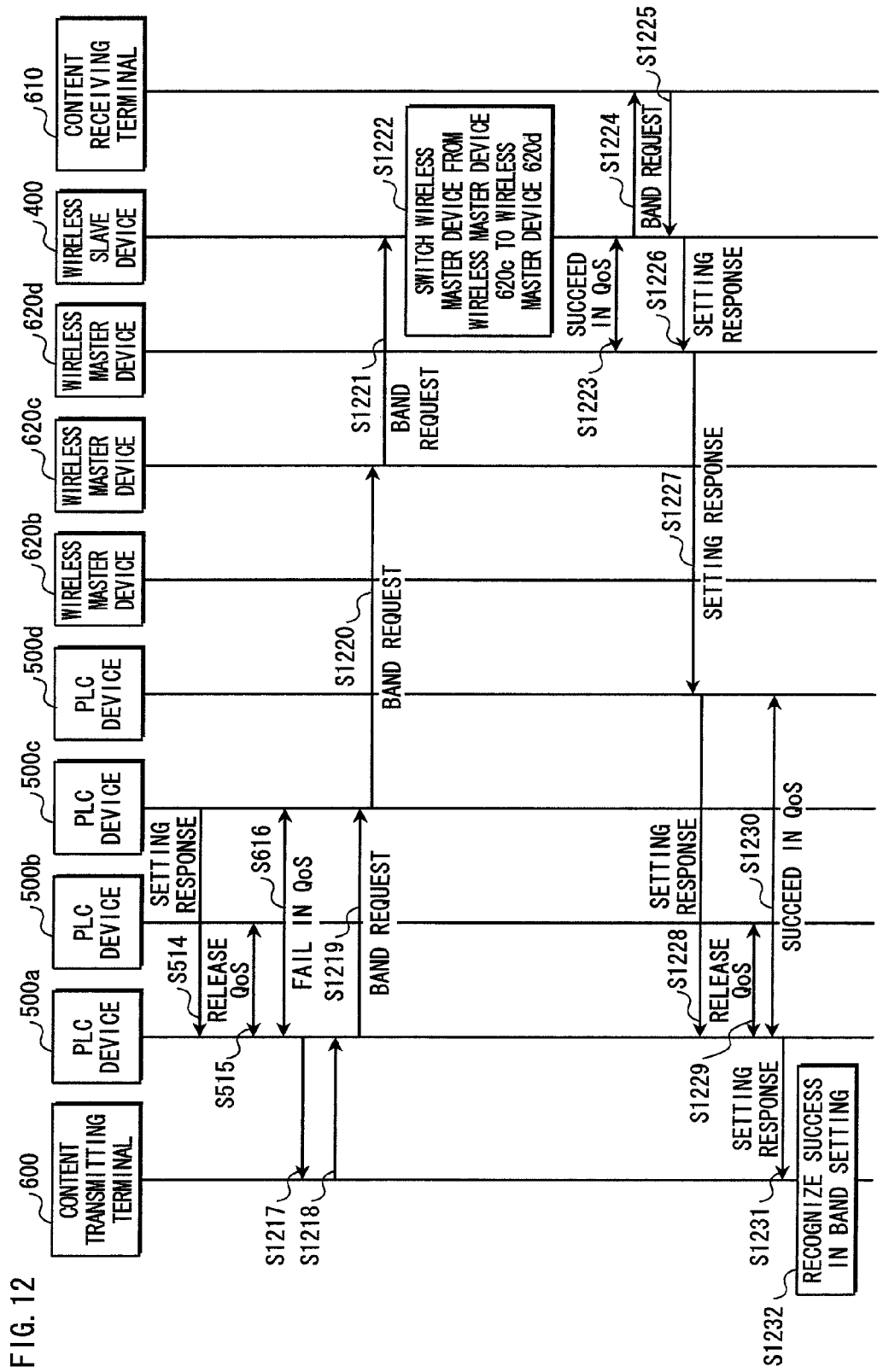
FIG. 12 is a sequence diagram showing a communication flow between devices of the band setting system of the second embodiment.

FIG. 12 is a communication flow of the second embodiment.

In this communication flow, the operation of each of the devices until the step S616 in the communication flow shown in FIG. 6 of the first embodiment is substantially same. Therefore, the explanation of the operation until the step S616 will be omitted. However, the wireless slave device 400 does not include the wireless master device setting unit that is the structural component of the wireless slave device 100 shown in the first embodiment. Thus, information indicating whether or not there is an unconnected wireless maser device is not added to a band setting response returned from the wireless slave device 400. Also, the PLC de vices do not analyze whether or not there is an unconnected wireless maser device.

Note that out of the operations until the step S616, only the operation of the content transmitting terminal 600 when the content is transmitted in the step S501 will be described. When receiving a request of transmitting the content from a high-order application, the request making unit 605 of the content transmitting terminal 600 makes a band setting request based on data indicating a band necessary for transmitting/receiving the content. Then, the request making unit 605 transfers the band setting request to the wired transmitting/receiving unit 606, and the wired transmitting/receiving unit 606 transmits the band setting request to the PLC device 500a.

In the step S515, the PLC device 500a that releases the QoS setting tries to perform the QoS setting with the PLC device 500c. Here, suppose that the QoS setting failed (step S616).

Then, a PLC QoS setting unit 507a of the PLC device 500a transfers a result of the judgment to a path switch information analyzing unit 509a. Here, the PLC QoS setting unit 507a notifies the path switch information analyzing unit 509a that the QoS setting failed. Also, the PLC. QoS setting unit 507a performs the QoS resetting with the PLC device 500b when the QoS setting failed. The path switch information analyzing unit 509a writes the judgment result indicating "failure" in the band setting response, and transmits the band setting response to the content transmitting terminal 600 via a wired transmitting/receiving unit 501a (step S1217).

The data analyzing unit 601 of the content transmitting terminal 600 analyzes the data received by the wired transmitting/receiving unit 606. When analyzing that the received data is the band setting response, the data analyzing unit 601 transfers the band setting response to the response processing unit 602. The response processing unit 602 recognizes that the band setting in the path failed from the information that is included in the band setting response and indicates whether or not the QoS setting succeeded, and transfers the band setting response to the path switch information analyzing unit 603.

The path switch information analyzing unit 603 analyzes path switch information that is added to the band setting response by the wireless slave device 400 and indicates whether or not the wireless slave device 400 has switched the wireless master devices. When recognizing that the wireless slave device 400 has switched the wireless master devices, the path switch information analyzing unit 603 instructs the request making unit 605 to make a band setting request. The request making unit 605 transmits the band setting request to the wired transmitting/receiving unit 606, and the wired transmitting/receiving unit 606 transmits the band setting request to the PLC device 500a (step S1218).

When analyzing that data received by the wired transmitting/receiving unit 501a is the band setting request, a data analyzing unit 502a of the PLC device 500a transfers the band setting request to a request processing unit 504a. The request processing unit 504a transfers the band setting request to the PLC QoS setting unit 507a, and the PLC QoS setting unit 507a tries to perform the QoS setting with the PLC device 500c in a PLC network 460. This is because the wireless master device 620c to which the wireless slave device 400 is connected is connected to the PLC device 500c.

However, suppose that the QoS setting failed here, same as in the case shown in the step S616. Then, the PLC QoS setting unit 507a performs the QoS resetting with the PLC device 500b. Also, the PLC QoS setting unit 507a notifies the request processing unit 504a that the QoS setting with the PLC device 500c failed. The request processing unit 504a writes "failure" as information indicating that the QoS setting failed in the band setting request, and transmits the band setting request to the PLC device 500c via a PLC transmitting/receiving unit 503a (step S1219).

A data analyzing unit 502c of the PLC device 500 analyzes content of data received by a PLC transmitting/receiving unit 503c. When analyzing that the received data is the band setting request, the data analyzing unit 502c transfers the data to a request processing unit 504c. When recognizing that the transferred data is the band setting request, the request processing unit 504c transfers the information included in the band setting request to a PLC QoS setting unit 507c.

When recognizing that the transferred data is the band setting request, the PLC QoS setting unit 507c transfers information indicating that the QoS setting has been performed to the request processing unit 504c, based on information indicating that the QoS setting has been performed by the PLC device 500a, i.e. the QoS setting has already been tried. The request processing unit 504c transfers the band setting request to a wired transmitting/receiving unit 501c, and the wired transmitting/receiving unit 501c transmits the band setting request to the wireless master device 620c (step S1220).

When receiving the band setting request, the wireless master device 620c transmits the band setting request to the wireless slave device 400 (step S1221).

When receiving the band setting request, the wireless transmitting/receiving unit 403 of the wireless slave device 400 transfers the received data to the data analyzing unit 402. When recognizing that the analyzed data is the band setting request, the data analyzing unit 402 transfers the band setting request to the request processing unit 404. The request processing unit 404 inputs the information included in the band setting request to the wireless QoS setting unit 407. When recognizing that the information indicates "failure", the wireless QoS setting unit 407 instructs the wireless master device managing unit 411 to switch the wireless master device that is the wireless connection destination before the QoS setting is performed in a wireless network 470.

The wireless master device managing unit 411 refers to the connection table to search a wireless master device whose connection flag is "0". Because the wireless master device whose connection flag is "0" is the wireless master device 620d, the wireless master device managing unit 411 instructs the wireless master device switching unit 412 to switch the wireless connection destination to the wireless master device 620d. The wireless master device switching unit 412 switches the wireless connection destination to the wireless master device 620d, and notifies the wireless master device managing unit 411 that the switch of the wireless master devices has been completed. When receiving the notification, the wireless master device managing unit 411 updates the connection flag of the wireless master device 620d from "0" to "1", and notifies the wireless QoS setting-unit 407 that the switch of the wireless master devices has been completed (step S1222).

When receiving the notification indicating that the switch of the wireless master devices has been completed, the wireless QoS setting unit 407 requests the wireless QoS requesting unit 408 to perform the QoS resetting with the wireless master device 620d.

The wireless QoS requesting unit 408 makes a wireless QoS setting request based on data for the wireless QoS setting notified from the wireless QoS setting unit 407. Also, the wireless QoS requesting unit 408 performs a negotiation with the wireless master device 620d via the wireless transmitting/receiving unit 403, and performs the wireless QoS setting in the wireless network 470. When receiving a wireless QoS setting response to the wireless QoS setting request from the wireless master device 620d, the wireless transmitting/receiving unit 403 transfers the wireless QoS setting response to the data analyzing unit 402.

When analyzing that the transferred data is the wireless QoS setting response, the data analyzing unit 402 transfers the wireless QoS setting response to the wireless QoS responding unit 406. The wireless QoS responding unit 406 extracts the information that is included in the wireless QoS setting response and indicates whether or not the wireless QoS setting succeeded, and transfers the extracted information to the wireless QoS setting unit 407. Then, the wireless QoS setting unit 407 judges whether or not the wireless QoS setting succeeded based on the transferred data. Here, suppose that the wireless master device 620d can assign a band requested by the wireless slave device 400 to the wireless slave device 400, and the wireless QoS setting succeeded (step S1223). Note that when the wireless QoS setting failed, the wireless slave device 400 searches a next wireless master device.

The wireless QoS setting unit 407 transfers a result of the judgment indicating that the wireless QoS setting succeeded to the request processing unit 404. When receiving the judgment result, the request processing unit 404 writes information indicating that the wireless QoS setting succeeded in the band setting request, and transfers the band setting request to the wired transmitting/receiving unit 401. Then, the wired transmitting/receiving unit 401 transmits the band setting request to the content receiving terminal 610 (step S1224).

The content receiving terminal 610 returns the band setting response including the judgment result of the QoS setting included in the band setting request (step S1225).

When receiving the band setting response, the wired transmitting/receiving unit 401 transfers the band setting response to the data analyzing unit 402. When analyzing that the transferred data is the band setting response, the data analyzing unit 402 transfers the band setting response to the response processing unit 405. The response processing unit 405 confirms the information indicating whether or not the QoS setting succeeded, which is included in the transferred band setting response. Here, the information indicates "success". Therefore, the response processing unit 405 transfers the band setting response to the path switch information setting unit 409. Note that when the information indicates "failure", the response processing unit 405 instructs the wireless QoS setting unit 407 to release the QoS setting, and the wireless QoS setting unit 407 requests the wireless master device 620d to release the QoS setting.

When receiving the band setting response, the path switch information setting unit 409 transfers a content identifier included in the band setting response to the wireless QoS setting unit 407. When the content identifier is inputted to the wireless QoS setting unit 407, the wireless QoS setting unit 407 transfers, to the path switch information setting unit 409, information indicating whether or not the wireless master device has been switched when the QoS setting of the content is performed, and information indicating the wireless master device before the switching and the wireless master device after the switching. Here, the wireless QoS setting unit 407 notifies the path switch information setting unit 409 that the wireless connection destination is switched from the wireless master device 620c to the wireless master device 620d. When receiving the notification, the path switch information setting unit 409 adds, to the band setting response, path switch information indicating that the wireless connection destination is switched from the wireless master device 620c to the wireless master device 620d. Then, the path switch information setting unit 409 transfers the band setting response to which the path switch information is added to the wireless transmitting/receiving unit 403. Then, the wireless transmitting/receiving unit 403 transmits the band setting response to the wireless master device 620d (step S1226).

When receiving the band setting response, the wireless master device 620d transmits the band setting response to the PLC device 500d to which the wireless master device 620d is connected (step S1227).

When receiving the band setting response, a wired transmitting/receiving unit 501d of the PLC device 500d transfers the band setting response to a data analyzing unit 502d. When analyzing that the received data is the band setting response, the data analyzing unit 502d transfers the band setting response to a response processing unit 505d. Then, the response processing unit 505d confirms the information that is included in the band setting response and indicates whether or not the QoS setting succeeded. Here, the information indicates "success". Therefore, the response processing unit 505d transfers the band setting response to a path switch information analyzing unit 509d.

The path switch information analyzing unit 509d analyzes the path switch information added to the transferred band setting response. When analyzing that the wireless master device to which the wireless slave device 400 is wirelessly connected is switched from the wireless master device 620c to the wireless master device 620d based on the path switch information, the path switch information analyzing unit 509d requests a PLC QoS setting unit 507d to perform the QoS resetting in the PLC network 460. This is because the QoS setting is not performed between the PLC device 500d and the PLC device 500a.

However, the PLC device 500a has performed the band setting with regard to the content identifier included in the band setting response with the PLC device 500b. Therefore, the PLC device 500d cannot perform the QoS setting with regard to the content with the PLC device 500a. Thus, the PLC QoS setting unit 507d transfers information indicating that the QoS setting has not been performed in the PLC device 500d to the path switch information analyzing unit 509d without performing the QoS resetting. When receiving the information, the path switch information analyzing unit 509d transfers the band setting response to a PLC transmitting/receiving unit 503d, and the PLC transmitting/receiving unit 503d transmits the band setting response to the PLC device 500a (step S1228).

When receiving the band setting response, the PLC transmitting/receiving unit 503a of the PLC device 500a transfers the band setting response to the data analyzing unit 502a. When analyzing that the received data is the band setting response, the data analyzing unit 502a transfers the band setting response to a response processing unit 505a. The response processing unit 505a extracts the information indicating whether or not the QoS setting succeeded from the transferred band setting response. Here, the response processing unit 505a analyzes that the QoS setting succeeded, and transfers the band setting response to the path switch information analyzing unit 509a.

When the band setting response is inputted to the path switch information analyzing unit 509a, the path switch information analyzing unit 509a analyzes the path switch information included in the band setting response. When recognizing that the wireless master device has been switched in the wireless slave device 400 after analyzing the path switch information, the path switch information analyzing unit 509a instructs the PLC QoS setting unit 507a to perform the QoS resetting in the PLC network 460. When receiving the instruction, the PLC QoS setting unit 507a releases the QoS setting of the content with the PLC device 500b because the QoS setting of the content has been performed with the PLC device 500b (step S1229).

After releasing the QoS setting, the PLC QoS setting unit 507a performs the QoS setting of the content with the PLC device 500d in the same manner as with the PLC device 500b. Here, suppose that the QoS setting succeeded (step S1230).

Then, the PLC QoS setting unit 507a transfers the information indicating whether or not the QoS setting succeeded to the path switch information analyzing unit 509a. The path switch information analyzing unit 509a writes the information indicating whether or not the QoS setting succeeded in the band setting response. Note that the information indicates "success" here. Then, the path switch information analyzing unit 509a transfers the band setting response to the wired transmitting/receiving unit 501a, and the wired transmitting/receiving unit 501a transmits the band setting response to the content transmitting terminal 600 (step S1231).

Then, the content transmitting terminal 600 analyzes the transmitted band setting response and recognizes that the QoS setting succeeded (step S1232). After that, the content transmitting terminal 600 starts transmitting the content.

As mentioned above in the second embodiment, the content transmitting terminal 600 transmits the band setting request again in order to perform the QoS setting shown in the step S1218. This is a feature different from the first embodiment.

<Third Embodiment>

Each of the first and second embodiments discloses a closed network in which the content transmitting terminal is certainly connected to the content receiving terminal even if the wireless slave device is connected to any wireless master device. However, a third embodiment describes a case in which a wireless master device to which a wireless slave device can be connected cannot necessarily be connected to a content transmitting terminal.

<Structure>

Figure 13:
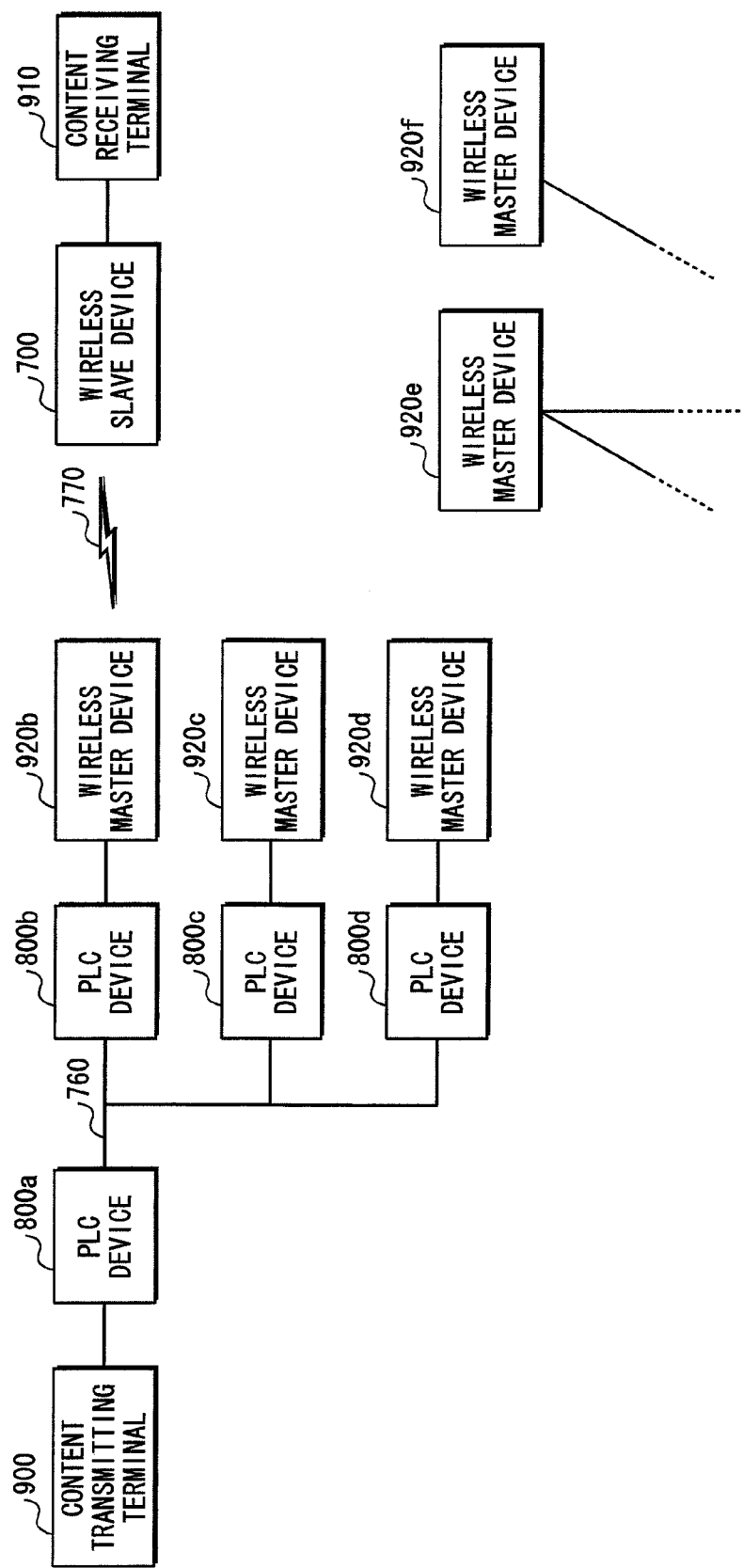
FIG. 13 is a system diagram showing a structure of a band setting system of a third embodiment.

FIG. 13 is a system diagram showing a structure of a band setting system of the third embodiment. As shown in FIG. 13, the band setting system includes a wireless slave device 700, PLC devices 800*a*, 800*b*, 800*c*, 800*d*, a content transmitting terminal 900, a content receiving terminal 910, wireless master devices 920*b*, 920*c*, and 920*d*. The basic structure of the band setting system is same as in the first embodiment. Here, as wireless master devices to which the wireless slave device 700 can be connected, wireless master devices 902*e* and 902*f* are shown. However, the wireless master devices 902*e* and 902*f* are not connected to the content transmitting terminal 900.

The wireless slave device 700 has a same function as the wireless slave device 100 described in the first embodiment. Therefore, the detailed explanation thereof will be omitted, and a function other than the function described in the first embodiment will be described.

The wireless QoS setting unit 107 further analyzes address information of the wireless master device included in the band setting request, and transfers the address information to the wireless master device managing unit 111.

The wireless master device setting unit 110 further adds address information of all connectable wireless master devices to the band setting response.

The wireless master device managing unit 111 also updates the connection table managed by the wireless slave device 700 based on the address information of the wireless master device, which is transferred from the wireless QoS setting unit 107.

The PLC devices 800*a* to 800*d* have the same function as the PLC device 200 in the first embodiment. Therefore, the explanation thereof will be omitted.

Figure 14:
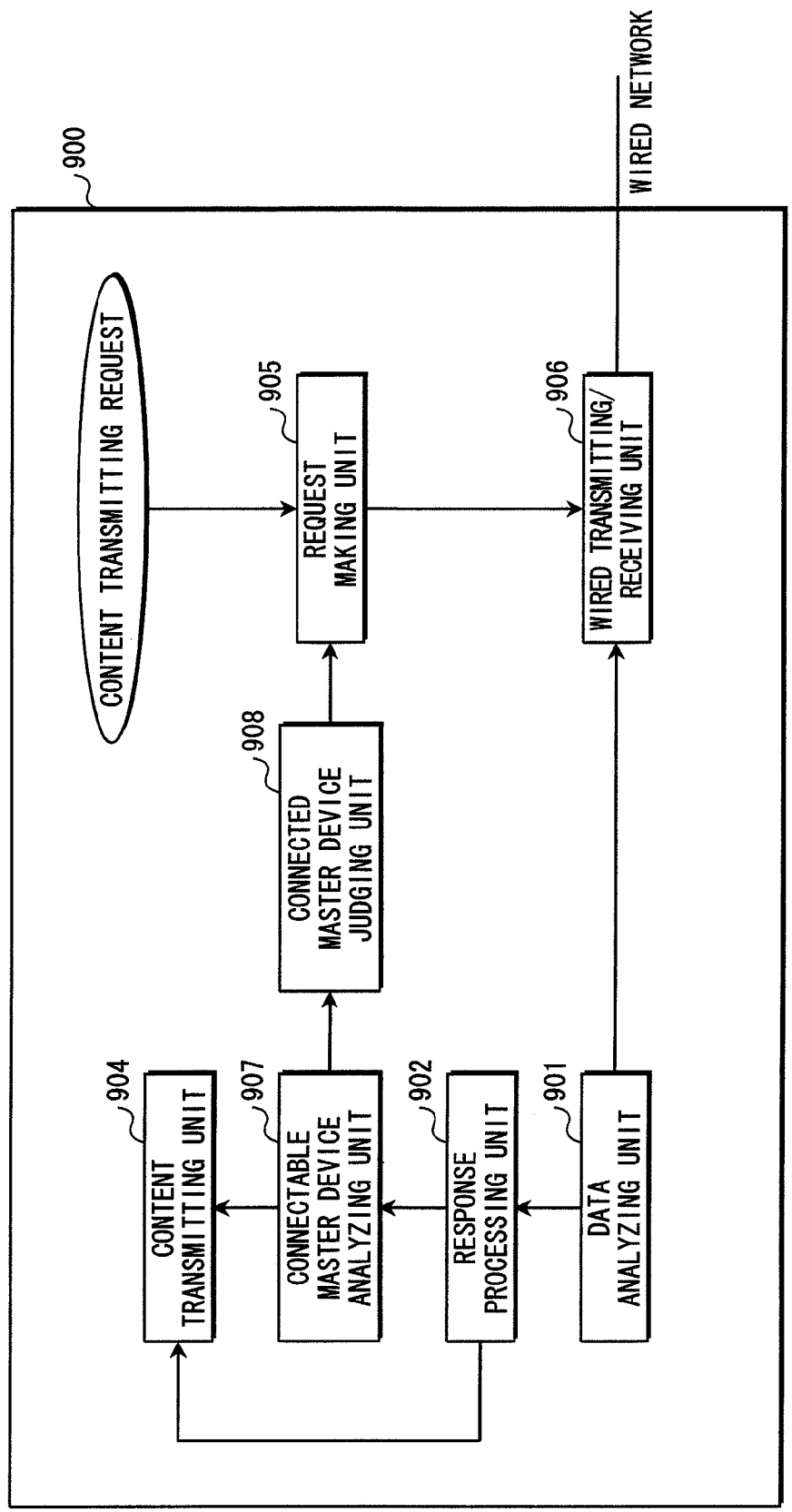
FIG. 14 is a functional block diagram showing a functional structure of a wireless slave device of the third embodiment.
Figure 17:
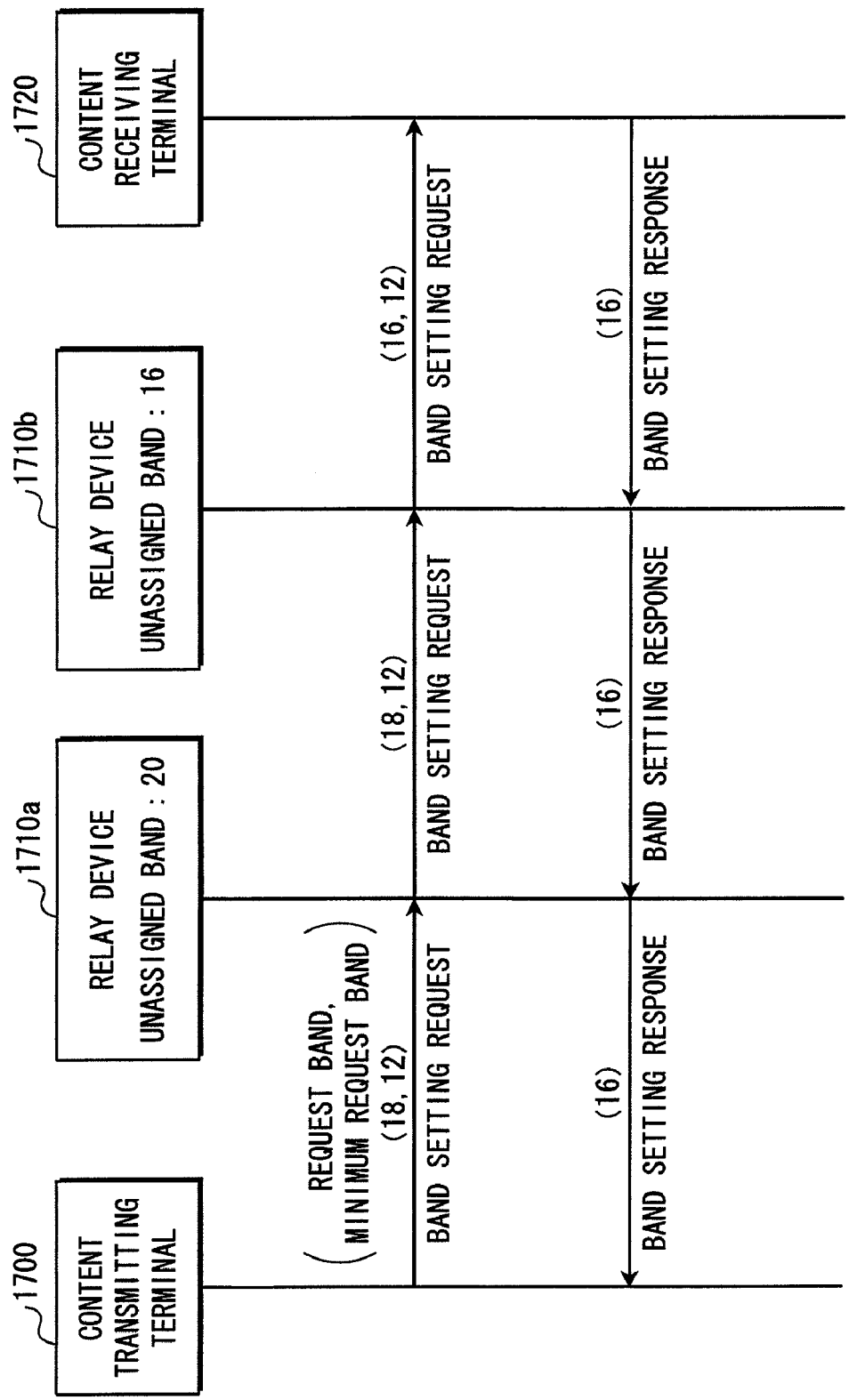
FIG. 17 is a sequence diagram showing a communication flow between devices of a conventional band setting system of a patent document 1.
Figure 18:
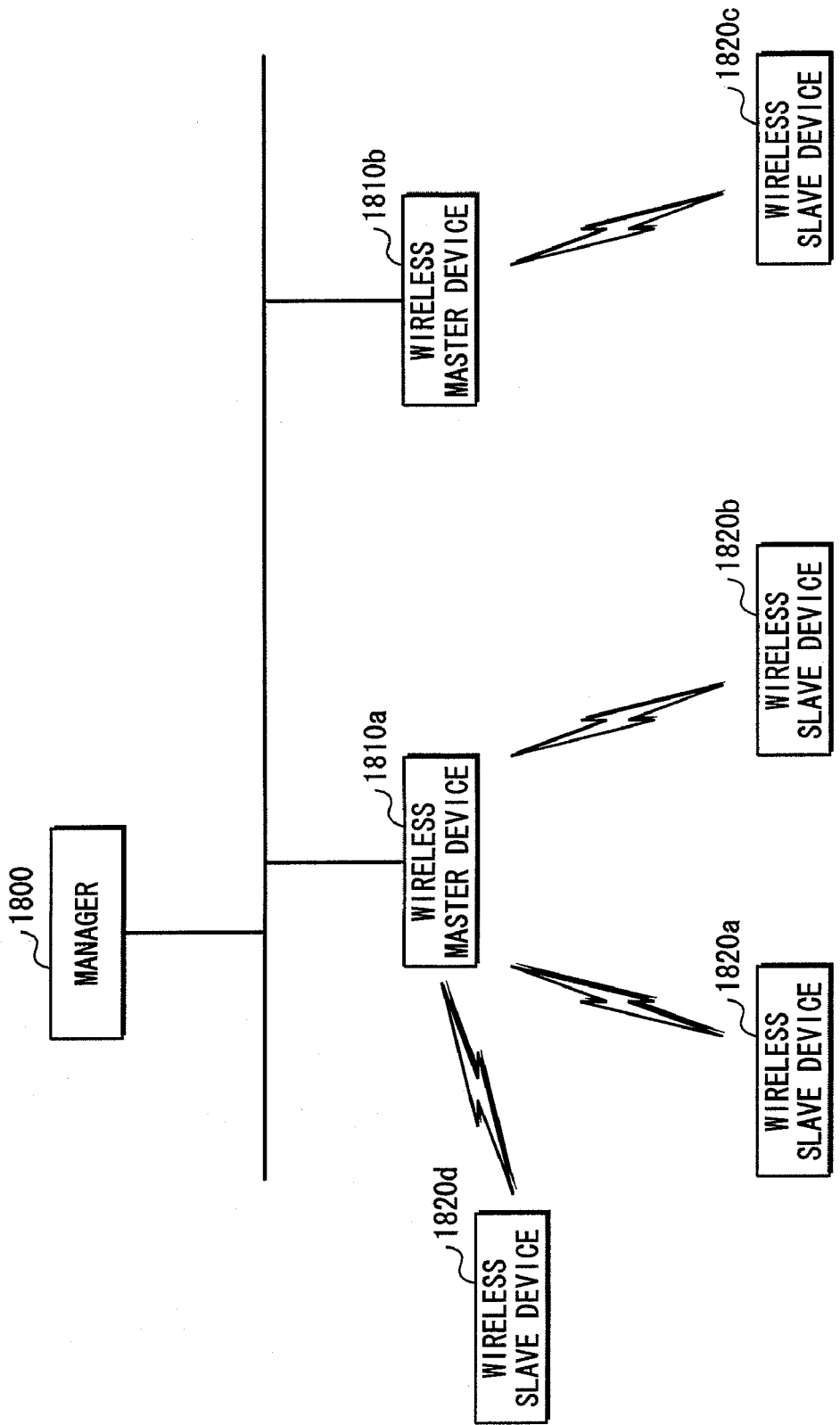
FIG. 18 is a system diagram showing a structure of a system of a patent document 2.

FIG. 14 is a functional block diagram showing a functional structure of the content transmitting terminal 900 of the third embodiment. As shown in FIG. 14, the content transmitting terminal 900 includes a data analyzing unit 901, a response processing unit 902, a content transmitting unit 904, a request making unit 905, a wired transmitting/receiving unit 906, a connectable master device analyzing unit 907, and a connected master device judging unit 908. The content transmitting terminal 900 is different from the content transmitting terminal 600 in the second embodiment in that the content transmitting terminal 900 further includes the connectable master device analyzing unit 907 and the connected master device judging unit 908 as shown in FIG. 14. In the content transmitting terminal 900, the structural components having the same names as in the content transmitting terminal 600 have the same functions as in the content transmitting terminal 600. Therefore, the explanation thereof will be omitted.

The connectable master device analyzing unit 907 analyzes the information of the connectable wireless master devices, which is added to the band setting response by the wireless slave device 700, and transfers the information of the connectable wireless master devices obtained as a result of the analysis to the connected master device judging unit 908.

The connected master device judging unit 908 compares the information of the connectable wireless master devices of the wireless slave device 700, which is transferred from the connectable master device analyzing unit 907, with information of the wireless master devices on an extension of the network to which the content transmitting terminal 900 is connected, which has been held by the content transmitting terminal 900. Then, the connected master device judging unit 908 notifies the request making unit 905 of information of an identical wireless master device.

Then, the request making unit 905 adds the notified information of the identical wireless master device to the band setting request, and transmits the band setting request to the PLC device 800*a* via the wired transmitting/receiving unit 906.

<Data>

FIG. 16 shows a connection table of the third embodiment. FIG. 16A is the connection table held by the wireless slave device 700. However, the connection table is different from the connection table described in the first embodiment in that the connection table of the third embodiment stores addresses of the wireless master devices 902*e* and 902*f* that are not connected to the content transmitting terminal 900, and connection histories with the wireless master devices 902*e* and 902*f*. The band setting response returned by the wireless slave device 700 includes the information of the connectable wireless master devices 902*e* and 902*f*.

On the other hand, FIG. 16B shows a connection table 1610. The connection table 1610 is made by the following way. The content transmitting terminal 900 extracts the information of the wireless master devices on the extension of the network to which the content transmitting terminal 900 is connected from the information of all of the connectable wireless master devices as shown in the connection table, which is received from the wireless slave device 700. Then, the content transmitting terminal 900 returns the extracted information to the wireless slave device 700. Because the wireless master devices 902*e* and 902*f* are not connected to the content transmitting terminal 900, the wireless master devices 902*e* and 902*f* are deleted from the connection table 1610. This information is also transferred to the request making unit 905 of the content transmitting terminal 900 by the connected master device judging unit 908.

<Operation>

FIG. 15 is a communication flow of the band setting system of the third embodiment. The following describes an operation of each device composing the band setting system of the third embodiment, with reference to the communication flow.

In the communication flow shown in FIG. 15, the operation of each device until the step S506 in the communication flow show in FIG. 5 in the first embodiment is same. Therefore, the explanation thereof will be omitted and an operation after the step S506 will be described.

Suppose that the QoS setting between the wireless slave device 700 and the wireless master device 920*b* failed (step S506). In the case of each of the first and second embodiments, the wireless slave device switches the wireless master devices. However, in the third embodiment, the wireless connection destination is not switched here because it is assumed that the wireless master devices to which the wireless slave device 700 can be wirelessly connected are not necessarily connected to the content transmitting terminal via the network.

The wireless QoS setting unit 107 of the wireless slave device 700 transfers a result of the judgment indicating that the QoS setting failed to the request processing unit 104. The request processing unit 104 writes the judgment result indicating that the QoS setting failed in the band setting request, and transmits the band setting request to the content receiving terminal 910 via the wired transmitting/receiving unit 101 (step S1507).

When the band setting request is inputted to the content receiving terminal 910, the content receiving terminal 910 transmits the band setting response including the information that is included in the band setting request and indicates whether or not the QoS setting succeeded (the information indicates "failure" here) to the wireless slave device 700 in order to return the band setting response to the content transmitting terminal 900 (step S1508).

When recognizing that the data received by the wired transmitting/receiving unit 101 of the wireless slave device 700 is the band setting response, the data analyzing unit 102 transfers the band setting response to the response processing unit 105. When the band setting response is inputted to the response processing unit 105, the response processing unit 105 confirms the information that is included in the band setting response and indicates whether or not the QoS setting succeeded, and transfers the band setting response to the path switch information setting unit 109.

When the band setting response is transferred to the path switch information setting unit 109, the path switch information setting unit 109 transfers a content identifier included in the band setting response to the wireless QoS setting unit 107. When the content identifier is inputted to the wireless QoS setting unit 107, the wireless QoS setting unit 107 transfers path switch information indicating whether or not the wireless master device has been switched when the QoS setting is performed with regard to the content to the path switch information setting unit 109. Here, the path switch information indicates that the wireless master device has not been switched. The path switch information setting unit 109 adds the path switch information to the band setting response, and transfers the band setting response to which the path switch information is added to the wireless master device setting unit 110.

When receiving the band setting response, the wireless master device setting unit 110 confirms that the QoS setting failed in the wireless slave device 700, and obtains the address information of the connectable wireless master devices from the wireless master device managing unit 111. The wireless master device setting unit 110 obtains the address information corresponding to the content identifier, which is stored in a connection table 1600.

When receiving a request of the address information of unconnected wireless-master devices, the wireless master device managing unit 111 transfers, to the wireless master device setting unit 110, the address information of wireless master devices whose connection flags are "0" out of the address information of the wireless master devices as the address information of the unconnected wireless master devices. Here, the wireless master device managing unit 111 transfers address information of each of the wireless master devices 920*c*, 920*d*, 920*e*, and 920*f* to the wireless master device setting unit 110. When receiving the address information, the wireless master device setting unit 110 adds the address information to the band setting response, and transmits the band setting response to the wireless master device 920*b* via the wireless transmitting/receiving unit 103 (steps S1509 and S1510).

When receiving the band setting response, the wireless master device 920*b* transmits the band setting response to the PLC device 800*b* (step S1511).

When analyzing that data received by the wired transmitting/receiving unit 201*b* is the band setting response, the data analyzing unit 202*b* of the PLC device 800*b* transfers the band setting response to a response processing unit 205*b*. When the band setting response is inputted to the response processing unit 205*b*, the response processing unit 205*b* confirms the information that is included in the band setting response and indicates whether or not the QoS setting succeeded. Here, the information indicates "failure". Therefore, the response processing unit 205*b* transfers the band setting response to a path switch information analyzing unit 209*b*.

The path switch information analyzing unit 209*b* analyzes the path switch information added to the band setting response and recognizes that the wireless slave device 700 has not switched the wireless master devices. Then, the path switch information analyzing unit 209*b* instructs the PLC QoS setting unit 207*b* to release the QoS setting. However, the PLC QoS setting unit 207*b* has not performed the QoS setting in a PLC network 760. Therefore, the PLC QoS setting unit 207*b* cannot release the QoS setting, and transfers information indicating that the QoS setting has not been performed to the path switch information analyzing unit 209*b*. When receiving the information indicating that the QoS setting has not been performed from the PLC QoS setting unit 207*b*, the path switch information analyzing unit 209*b* transmits the band setting response to the PLC device 800*a* via the PLC transmitting/receiving unit 203*b* (step S1512).

When analyzing that data received by the wired transmitting/receiving unit 201*a* is the band setting response, the data analyzing unit 202*a* of the PLC device 800*a* transfers the band setting response to the response processing unit 205*a*. When the band setting response is inputted to the response processing unit 205*a*, the response processing unit 205*a* confirms the information that is included in the band setting response and indicates whether or not the QoS setting succeeded. Here, the information indicates "failure". Therefore, the response processing unit 205*a* transfers the band setting response to the path switch information analyzing unit 209*a*.

The path switch information analyzing unit 209*a* analyzes the path switch information added to the band setting response, and recognizes that the wireless slave device 700 has not switched the wireless master devices. Then, the path switch information analyzing unit 209*a* instructs the PLC QoS setting unit 207*a* to release the QoS setting. When receiving the instruction, the PLC QoS setting unit 207*a* releases the QoS setting with the PLC device 800*b* in the PLC network 760. When the release of the QoS setting is completed, the PLC QoS setting unit 207*a* notifies the path switch information analyzing unit 209*a* that the release of the QoS setting has been completed. When receiving the notification, the path switch information analyzing unit 209*a* transmits the band setting response to the content transmitting terminal 900 via the wired transmitting/receiving unit 201*a* (step S1513).

The wired transmitting/receiving unit 906 of the content transmitting terminal 900 transfers the received data to the data analyzing unit 901. The data analyzing unit 901 analyzes the transferred data and recognizes that the transferred data is the band setting response. Then, the data analyzing unit 901 transfers the band setting response to the response processing unit 902. The response processing unit 902 analyzes the information that is included in the band setting response and indicates whether or not the QoS setting succeeded, and recognizes that the band setting in a path to the content receiving terminal 910 failed. Then, the response processing unit 902 transfers the band setting response to the connectable master device analyzing unit 907. Note that when the band setting succeeded, the response processing unit 902 instructs the content transmitting terminal 900 to transmit a content corresponding to the content identifier included in the band setting response.

The connectable master device analyzing unit 907 analyzes the address information added to the band setting response by the wireless master device setting unit 110 of the wireless slave device 700. When recognizing that the connectable wireless master devices of the wireless slave device 700 are the wireless master devices 920*c*, 920*d*, 920*e*, and 920*f*, the connectable master device analyzing unit 907 transfers address information of each of the wireless master devices 920*c*, 920*d*, 920*e*, and 920*f* to the connected master device judging unit 908. The connected master device judging unit 908 confirms whether or not the address information transferred from the connectable master device analyzing unit 907 is registered in the address information in a connected wireless master device list that has been held by the connected master device judging unit 908. Note that the connected wireless master device list is list information that registers the address information of the wireless master devices to which the content transmitting terminal 900 can be connected via the network. For example, a filtering table of the layer 2 that is an OSI (Open Systems Interconnection) reference model is used for the connected wireless master device list. Here, the wireless master devices 920*c* and 920*d* are registered in the connected wireless master device list.

Then, the connected master device judging unit 908 transfers address information of each of the wireless master devices 920*c* and 920*d* to the request making unit 905. The request making unit 905 makes a band setting request including the address information of each of the wireless master devices 920*c* and 920*d*. Then, the request making unit 905 transmits the band setting request to the PLC device 800*a* via the wired transmitting/receiving unit 906 (step S1515).

When analyzing that data received by the wired transmitting/receiving unit 201*a* is the band setting request, the data analyzing unit 202*a* of the PLC device 800*a* transfers the band setting request to the request processing unit 204*a*. The request processing unit 204*a* transfers data indicating a band to be set, which is included in the inputted band setting request, to the PLC QoS setting unit 207*a*. Then, the PLC QoS setting unit 207*a* performs the QoS setting in the PLC network 760 with the PLC device 800*a*. Here, suppose that the QoS setting succeeded (step S1516).

Then, the PLC QoS setting unit 207*a* notifies the request processing unit 204*a* that the QoS setting succeeded, and the request processing unit 204*a* writes "success" that is a result of the judgment whether or not the QoS setting succeeded in the band setting request. Then, the request processing unit 204*a* transmits the band setting request to the PLC device 800*b* via the wired transmitting/receiving unit 201*a* (step S1517).

The data analyzing unit 202*b* of the PLC device 800*b* analyzes the data received by the PLC transmitting/receiving unit 203*b*. When analyzing that the received data is the band setting request, the data analyzing unit 202*b* transfers the data to the request processing unit 204*b*. When recognizing that the transferred data is the band setting request, the request processing unit 204*b* transfers the information included in the band setting request to the PLC QoS setting unit 207*b*.

When recognizing that the transferred data is the band setting request, the PLC QoS setting unit 207*b* transfers information indicating that the QoS setting has been performed to the request processing unit 204*b*, based on the information indicating that the QoS setting succeeded with the PLC device 200*a*. The request processing unit 204*b* transfers the band setting request to the wired transmitting/receiving unit 201*b*, and the wired transmitting/receiving unit 201*b* transmits the band setting request to the wireless master device 920*b* (step S1518).

When receiving the band setting request, the wireless master device 920*b* transmits the band setting request to the wireless slave device 700 (step S1519).

The data analyzing unit 102 of the wireless slave device 700 analyzes that the data received by the wireless transmitting/receiving unit 103 is the band setting request, and transfers the band setting request to the request processing unit 104. The request processing unit 104 analyzes the transferred band setting request, and transfers the information included in the band setting request to the wireless QoS setting unit 107. The wireless QoS setting unit 107 updates the connection table with regard to the content identifier so as to be the connection table 1610 in FIG. 16B, based on the address information of the connectable wireless master devices of the content transmitting terminal 900, which is included in the transferred information and added by the content transmitting terminal 900. Then, the wireless QoS setting unit 107 searches the wireless master devices whose connection flags are "0" from the connection table 1610. Here, connection flags of the wireless master devices 920*c* and 920*d* are "0". The wireless master device managing unit 111 selects one of the wireless master devices 920*c* and 920*d* that transmits a beacon signal having a higher receiving electric field strength, and instructs the wireless master device switching unit 112 to switch the wireless master devices that are wireless connection destinations. Here, suppose that the wireless master device 920*c* transmits the beacon signal having the higher receiving electric field strength.

When receiving the instruction of switching the wireless connection destination to the wireless master device 920*c*, from the wireless master device managing unit 111, the wireless master device switching unit 112 switches the connection destination to the wireless master device 920*c*. When the switch has been completed, the wireless master device switching unit 112 notifies the wireless master device managing unit 111 that the switch has been completed. The wireless master device managing unit 111 updates a connection flag of the wireless master device 920*c* corresponding to the content in the connection table to "1", and notifies the wireless QoS setting unit 107 that the switch of the wireless master devices has been completed (step S1520).

When receiving the notification, the wireless QoS setting unit 107 instructs the wireless QoS requesting unit 108 to perform the QoS setting in a wireless network 770.

The wireless QoS requesting unit 108 makes a wireless QoS setting request based on data for the wireless QoS setting notified from the wireless QoS setting unit 107. Then, the wireless QoS requesting unit 108 performs a negotiation with the wireless master device 920*c* via the wireless transmitting/receiving unit 103, and performs the wireless QoS setting in the wireless network 770. When receiving a wireless QoS setting response to the wireless QoS setting request from the wireless master device 920*c*, the wireless transmitting/receiving unit 103 transfers the wireless QoS setting response to the data analyzing unit 102.

When analyzing that the transferred data is the wireless QoS setting response, the data analyzing unit 102 transfers the wireless QoS setting response to the wireless QoS responding unit 106. The wireless QoS responding unit 106 extracts the information that is included in the wireless QoS setting response and indicates whether or not the wireless QoS setting succeeded, and transfers the extracted information to the wireless QoS setting unit 107. Then, the wireless QoS setting unit 107 judges whether or not the wireless QoS setting succeeded based on the transferred data. Here, suppose that the wireless master device 920c can assign a band requested by the wireless slave device 700 to the wireless slave device, and the wireless QoS setting succeeded (step S1521). Note that when the wireless QoS setting failed, the wireless slave device 700 searches a next wireless master device.

The wireless QoS setting unit 107 transfers the judgment result indicating that the wireless QoS setting succeeded to the request processing unit 104. When receiving the judgment result, the request processing unit 104 writes information indicating that the wireless QoS setting succeeded in the band setting request, and transfers the band setting request to the wired transmitting/receiving unit 101. Then, the wired transmitting/receiving unit 101 transmits the band setting request to the content receiving terminal 910 (step S1522).

The content receiving terminal 910 returns, to the wireless slave device 700, the band setting response including the judgment result that is included in the band setting request and indicates whether or not the QoS setting succeeded (step S1523).

When receiving the band setting response, the wired transmitting/receiving unit 101 of the wireless slave device 700 transfers the band setting response to the data analyzing unit 102. When analyzing that the transferred data is the band setting response, the data analyzing unit 102 transfers the band setting response to the response processing unit 105. The response processsing unit 105 confirms the information that is included in the transferred band setting response and indicates whether or not the QoS setting succeeded. Here, the information indicates "success". Therefore, the response processing unit 105 transfers the band setting response to the path switch information setting unit 109. Note that when the information indicates "failure", the response processing unit 105 instructs the wireless QoS setting unit 107 to release the QoS setting, and the wireless QoS setting unit 107 requests the wireless master device 920c to release the QoS setting.

When receiving the band setting response, the path switch information setting unit 109 transfers a content identifier included in the band setting response to the wireless QoS setting unit 107. When the content identifier is inputted to the wireless QoS setting unit 107, the wireless QoS setting unit 107 transfers, to the path switch information setting unit 109, information indicating whether or not the wireless master device has been switched when the QoS setting of the content is performed, and information indicating the wireless master device before the switching and the wireless master device after the switching. Here, the wireless QoS setting unit 107 notifies the path switch information setting unit 109 that the wireless connection destination has been switched from the wireless master device 920b to the wireless master device 920c.

When receiving the notification, the path switch information setting unit 109 adds, to the band setting response, path switch information indicating that the wireless connection destination has been switched from the wireless master device 920b to the wireless master device 920c. Then, the path switch information setting unit 109 transfers the band setting response to which the path switch information is added to the wireless master device setting unit 110. When the path switch information is added to the inputted band setting response, the wireless master device setting unit 110 transfers the content identifier included in the band setting response to the wireless master device managing unit 111.

When the content identifier is inputted to the wireless master device managing unit 111, the wireless master device managing unit 111 detects whether or not a connection flag in the connection table corresponding to the content identifier is "0", whether or not there is a wireless master device to which the wireless slave device 700 can be wirelessly connected, and to which the wireless slave device 700 has not been connected. When there is a wireless master device to which the wireless slave device 700 has not been connected, the wireless master device managing unit 111 notifies the wireless master device setting unit 110 that there is the unconnected wireless master device. Here, a connection flag of the wireless master device 920d is "0". Therefore, the wireless master device managing unit 111 notifies the wireless master device setting unit 110 that there is the unconnected wireless master device. The wireless master device setting unit 110 adds information indicating that there is the unconnected wireless master device to the band setting response, and transfers the band setting response to the wireless transmitting/receiving unit 103. Then, the wireless transmitting/receiving unit 103 transmits the band setting response to the wireless master device 920c (steps S1524 and S1525).

When receiving the band setting response, the wireless master device 920c transmits the band setting response to the PLC device 800c to which the wireless master device 920c is connected (step S1526).

When receiving the band setting response, the wired transmitting/receiving unit 201c of the PLC device 800c transfers the band setting response to the data analyzing unit 202c. When analyzing that the received data is the band setting response, the data analyzing unit 202c transfers the band setting response to the response processing unit 205c. Then, the response processing unit 205c confirms the information that is included in the band setting response and indicates whether or not the QoS setting succeeded. Here, the information indicates "success". Therefore, the response processing unit 205c transfers the band setting response to the path switch information analyzing unit 209c.

The path switch information analyzing unit 209c analyzes the path switch information added to the transferred band setting response. When analyzing that the connection destination of the wireless slave device 700 has been switched from the wireless master device 920b to the wireless master device 920c based on the path switch information, the path switch information analyzing unit 209c requests the PLC QoS setting unit 207c to perform the QoS resetting in the PLC network 760. This is because the QoS setting is not performed between the PLC device 800c and the PLC device 800a.

However, the PLC device 800a has performed the band setting with regard to the content identifier included in the band setting response with the PLC device 800b. Therefore, the PLC device 800c cannot perform the QoS setting with regard to the content with the PLC device 800a. Thus, the PLC QoS setting unit 207c transfers information indicating that the QoS setting has not been performed in the PLC device 800c to the path switch information analyzing unit 209c without performing the QoS resetting. When receiving the information, the path switch information analyzing unit 209c transfers the band setting response to the PLC transmitting/receiving unit 203c, and the PLC transmitting/receiving unit 203c transmits the band setting response to the PLC device 800a (step S1527).

When receiving the band setting response, the PLC transmitting/receiving unit 203a of the PLC device 800a transfers the band setting response to the data analyzing unit 202a. When analyzing that the received data is the band setting response, the data analyzing unit 202a transfers the band setting response to the response processing unit 205a. The response processing unit 205a extracts the information indicating whether or not the QoS setting succeeded from the transferred band setting response. Here, the response processing unit 205a analyzes that the information indicates "success", and transfers the band setting response to the path switch information analyzing unit 209a.

When the band setting response is inputted to the path switch information analyzing unit 209a, the path switch information analyzing unit 209a analyzes the path switch information included in the band setting response. When recognizing that the wireless master device has been switched in the wireless slave device 700 after analyzing the path switch information, the path switch information analyzing unit 209a instructs the PLC QoS setting unit 207a to perform the QoS resetting in the PLC network 760. When receiving the instruction, the PLC QoS setting unit 207a releases the QoS setting of the content with the PLC device 800b because the QoS setting of the content has been performed with the PLC device 800b (step S1528).

After releasing the QoS setting, the PLC QoS setting unit 207a performs the QoS setting of the content with the PLC device 800c in the same manner as with the PLC device 800b. Here, suppose that the QoS setting succeeded (step S1529).

Then, the PLC QoS setting unit 207a transfers the information indicating whether or not the QoS setting succeeded to the path switch information analyzing unit 209a. The path switch information analyzing unit 209a writes the information indicating whether or not the QoS setting succeeded in the band setting response. Note that the information indicates "success" here. Then, the path switch information analyzing unit 209a transfers the band setting response to the wired transmitting/receiving unit 201a, and the wired transmitting/receiving unit 201a transmits the band setting response to the content transmitting terminal 900 (step S1530).

Then, the content transmitting terminal 900 analyzes the transmitted band setting response and recognizes that the QoS setting succeeded (step S1531). After that, the content transmitting terminal 900 starts transmitting the content.

As mentioned above, in the third embodiment, when the wireless master devices to which the wireless slave device can be connected are not necessarily connected to the content transmitting terminal, the wireless slave device transmits the information of all of the wirelessly connectable wireless master devices to the content transmitting terminal. Then, the content transmitting terminal compares the information with information of the wireless master devices connected to the content transmitting terminal. As a result, the content transmitting terminal transmits the information of the wireless master devices that can secure a path to the wireless slave device. Then, the wireless slave device is wirelessly connected to the transmitted wireless master device and tries to perform the QoS setting. This is a great feature of the third embodiment. Because of this feature, the wireless slave device is less likely to be wirelessly connected to a useless wireless master device to connect, i.e. a wireless master device to which the content transmitting terminal cannot transmit the content, and the efficiency in the QoS setting can be improved.

<Supplement>

Up to now, the band setting system of the present invention has been described specifically through the embodiments. However, the technical scope of the present invention is not limited to the above-described embodiments. For example, the following are modifications.

(1) In the above-mentioned embodiments, the wireless master device is wirelessly connected to the wireless slave device. When the QoS setting failed between the wireless master device and the wireless slave device, the wireless slave device searches a new wireless master device to find a new path. However, in the present invention, the wireless master device and the wireless slave device are not limited to the wireless communication devices, and may be relay devices that are connected to each other by wire. Also, in the band setting system, a relay device corresponding to the wireless slave device in the above embodiments may search a content receiving path.

(2) In the flowchart shown in FIG. 6 in the first embodiment, the QoS resetting is performed with the PLC device in the step S611. However, it is not required to perform the QOS setting. The following is a reason why the QoS resetting is performed in the first embodiment. By performing the QoS resetting between the PLC devices, the system can recognize that there is a certain content receiving terminal that requests a content to be transmitted. When another content receiving terminal requests the content transmitting terminal to transmit a content, the content transmitting terminal secures a band for the certain content receiving terminal in the path from the content receiving terminal and the content transmitting terminal by giving priority to the band setting request of the certain content receiving terminal, and can transmit the content to the certain receiving terminal.

(3) In the above embodiments, the PLC device and the wireless master device are individual devices. However, the PLC device may be installed in the wireless master device. In the same manner as this, the wireless slave device may be installed in the content receiving terminal, and the PLC device may be installed in the content transmitting terminal.

(4) In the above embodiments, the wireless slave device switches a wireless connection destination in the order of descending the receiving electric field strengths of the beacon signals from the wireless master devices. However, the order is not limited to the order of descending the receiving electric field strengths. The wireless slave device may switches the wireless connection destination in the random order. Also, when a beacon signal includes information of a band that can be assigned by a wireless master device that transmits the beacon signal, the wireless slave device may analyze the information and switch the wireless connection destination in the order of descending assignable bands.

(5) In the first embodiment, the PLC device 200a performs the QoS setting in the PLC network 160. However, any PLC device may perform the QoS setting. For example, the PLC device 200b may perform the QoS setting.

(6) In the above embodiments, the content transmitting terminal transmits the band setting request. However, the content receiving terminal may transmit the band setting request.

(7) In the above embodiments, the wireless network complies with IEEE802.11e standard. However, the wireless network may comply with other wireless standard.

(8) In the above embodiments, with regard to the QoS setting in the wireless network, the HCCA method in which a wireless band is reserved is used. However, the present invention is not limited to the HCCA method. For example, a setting such as block ACK, priority order control based on priority of a packet, or a setting such as admission control may be performed, in addition to the HCCA method.

(9) In the above embodiments, each functional component of the wireless slave device may be realized by one or more LSI (Large Scale Integration) or VLSI (Very Large Scale Integration). Also, one functional component may be realized by a plurality of LSI or a combination of the LSI and other circuit. Moreover, a plurality of functional components may be realized by one LSI. The LSI may be system LSI, super LSI, ultra LSI, or the like.

A method of circuit integration is not limited to LSI, and can be realized by a dedicated circuit or a general-purpose processor. A FPGA (Field Programmable Gate Array) and a reconfigurable processor which can reconfigure a connection and a setting of a circuit cell in LSI may be used.

Moreover, if a technology of circuit integration which replaces a semiconductor technology comes along because of progress of a semiconductor technology or other technologies which derive from the semiconductor technology, integration of each functional block may rightly be performed using the technology. An application of a biotechnology may be regarded as the possibility.

Industrial Applicability

The wireless communication device of the present invention can be applied as a wireless communication device that can secure a predetermined band as much as possible when it is required to secure the predetermined band for delivering contents.

The invention claimed is:

1. A wireless terminal device that connects to any wireless master device of a plurality of wireless master devices connected to a data transmitting device and receives data transmitted from the data transmitting device via the wireless master device to which the wireless terminal device is connected, wherein a path between the data transmitting device and a first wireless master device, which is the wireless master device to which the wireless terminal device is connected, includes a section in which QoS secured communication is performable only when a predetermined band required for reception of the data is secured, and wherein the wireless terminal device comprises:

a wireless transmitting/receiving unit operable to transmit a signal to and receive the signal from the wireless master device to which the wireless terminal device is connected;

a band secure state notification receiving unit operable to receive a band secure request including a band secure state notification from the wireless master device to which the wireless terminal device is connected via the wireless transmitting/receiving unit, the band secure state notification, added to a frame by a relay device operating in the section, being information indicating whether or not the predetermined band is available in the section; and a connection switching unit operable to, when the band secure state notification indicating that the predetermined band is unavailable in the section, switch a connection destination of the wireless terminal device from the first wireless master device to a second wireless master device, which is another wireless master device of the plurality of wireless master devices.

2. The wireless terminal device of claim 1, further comprising:

a path switch information transmitting unit operable to, after the connection switching unit switches the connection destination, transmit a signal including path switch information to the second wireless master device via the wireless transmitting/receiving unit, the path switch information indicating that the connection destination has been switched.

3. The wireless terminal device of claim 2, wherein the path switch information is added to a band setting response and is transmitted to the second wireless master device, the band setting response being a response to a band setting request transmitted by the data transmitting device.

4. The wireless terminal device of claim 2, further comprising:

a wireless QoS setting request transmitting unit operable to, after the connection switching unit switches the connection destination, transmit a wireless QoS setting request to the wireless master device to which the wireless terminal device is connected via the wireless transmitting/receiving unit, the wireless QoS setting request requesting securing of the predetermined band in wireless communication between the wireless terminal device and the wireless master device to which the wireless terminal device is connected; and a wireless QoS setting response receiving unit operable to receive a wireless QoS setting response from the wireless master device to which the wireless terminal device is connected via the wireless transmitting/receiving unit, the wireless QoS setting response being a response to the wireless QoS setting request, wherein the path switch information transmitting unit transmits the signal including the path switch information to the second wireless master device, when the wireless QoS setting response includes information indicating that the predetermined band is available in the wireless communication.

5. The wireless terminal device of claim 1, further comprising:

a wireless QoS setting request transmitting unit operable to, after the connection switching unit switches the connection destination, transmit a wireless QoS setting request to the wireless master device to which the wireless terminal device is connected via the wireless transmitting/receiving unit, the wireless QoS setting request requesting securing of the predetermined band in wireless communication between the wireless terminal device and the wireless master device to which the wireless terminal device is connected; and a wireless QoS setting response receiving unit operable to receive a wireless QoS setting response from the wireless master device to which the wireless terminal device is connected via the wireless transmitting/receiving unit, the wireless QoS setting response being a response to the wireless QoS setting request, wherein the connection switching unit switches the connection destination from the second wireless master device to a third wireless master device, which is another wireless master device of the plurality of wireless master devices, when the wireless QoS setting response includes information indicating that the predetermined band is unavailable in the wireless communication.

6. The wireless terminal device of claim 1, further comprising:

a path switch information transmitting unit operable to, before the connection switching unit switches the connection destination, transmit a signal including path switch information to the first wireless master device via the wireless transmitting/receiving unit, the path switch information indicating that the connection destination is to be switched.

7. A data communication method for a wireless terminal device to receive data, the wireless terminal device being connectable to any wireless master device of a plurality of wireless master devices connected to a data transmitting device and the data being transmitted from the data transmitting device via a wireless master device, of the plurality of wireless master devices, to which the wireless terminal device is connected, the data communication method comprising:

a receiving step of, when a path between the data transmitting device and a first wireless master device, which is the wireless master device to which the wireless terminal device is connected, includes a section in which QoS secured communication is performable only when a predetermined band required for reception of the data is secured, receiving a band secure request including a band secure state notification from the wireless master device to which the wireless terminal device is connected, the band secure state notification, added to a frame by a relay device operating in the section, being information indicating whether or not the predetermined band is available in the section; and a switching step of, when the band secure state notification indicating that the predetermined band is not available in the section switching a connection destination of the wireless terminal device from the first wireless master device to a second wireless master device, which is another wireless master device of the plurality of wireless master devices.

* * * * *